(12) United States Patent
Kuhara et al.

(10) Patent No.: US 11,755,036 B2
(45) Date of Patent: Sep. 12, 2023

(54) INFORMATION PROCESSING DEVICE FOR ASSISTING A REMOTE OPERATION OF AN UNMANNED AERIAL VEHICLE

(71) Applicant: PANASONIC INTELLECTUAL PROPERTY MANAGEMENT CO., LTD., Osaka (JP)

(72) Inventors: Shunsuke Kuhara, Osaka (JP); Kazunobu Konishi, Osaka (JP); Stephen William John, Nara (JP); Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 17/369,341

(22) Filed: Jul. 7, 2021

(65) Prior Publication Data

US 2021/0333803 A1 Oct. 28, 2021

Related U.S. Application Data

(63) Continuation of application No. PCT/JP2019/043949, filed on Nov. 8, 2019.

(30) Foreign Application Priority Data

Jul. 8, 2019 (JP) .................................. 2019-127150

(51) Int. Cl.
 *G05D 1/06* (2006.01)
 *B64C 39/02* (2023.01)
 (Continued)

(52) U.S. Cl.
 CPC .......... *G05D 1/0646* (2013.01); *B64C 39/024* (2013.01); *G05D 1/0016* (2013.01);
 (Continued)

(58) Field of Classification Search
 CPC .. G05D 1/0646; G05D 1/0016; G05D 1/0816; G05D 1/101; B64C 39/024; B64U 2101/30; B64U 2201/20
 See application file for complete search history.

(56) References Cited

U.S. PATENT DOCUMENTS

2012/0173053 A1 7/2012 Ohtomo et al.
2018/0314268 A1* 11/2018 Tan ...................... B64C 39/024
(Continued)

FOREIGN PATENT DOCUMENTS

| JP | 05-317528 | 12/1993 |
| JP | 2012-140101 | 7/2012 |
| JP | 2019-015670 | 1/2019 |

OTHER PUBLICATIONS

International Search Report issued in International Pat. Appl. No. PCT/JP2019/043949, dated Dec. 24, 2019, along with an English translation thereof.

*Primary Examiner* — Michael J Zanelli
(74) *Attorney, Agent, or Firm* — GREENBLUM & BERNSTEIN, P.L.C.

(57) ABSTRACT

A controller obtains a first horizontal distance and a first vertical distance which are respectively a component in a horizontal direction and a component in a vertical direction among distances from an unmanned aerial vehicle to a surface of a particular place where elevation gradually increases or decreases along the horizontal direction, decides, based on a ratio of the first horizontal distance to the first vertical distance, a movement amount by which the unmanned aerial vehicle is to be moved simultaneously in both the horizontal direction and the vertical direction, and moves the unmanned aerial vehicle based on the movement amount.

13 Claims, 14 Drawing Sheets

(51) Int. Cl.
  *G05D 1/00* (2006.01)
  *G05D 1/08* (2006.01)
  *G05D 1/10* (2006.01)
  *B64U 101/30* (2023.01)

(52) U.S. Cl.
  CPC .......... *G05D 1/0816* (2013.01); *G05D 1/101* (2013.01); *B64U 2101/30* (2023.01); *B64U 2201/20* (2023.01)

(56) References Cited

U.S. PATENT DOCUMENTS

| | | |
|---|---|---|
| 2019/0118945 A1 | 4/2019 | Loveland et al. |
| 2019/0146524 A1* | 5/2019 | Chen .................... B64C 39/024 701/5 |
| 2020/0033890 A1 | 1/2020 | Sugaki |
| 2020/0159252 A1* | 5/2020 | Giuffrida ............... H04N 7/185 |

* cited by examiner

FIG.6

| OPERATION AMOUNT | 0 | 1 | 2 | 3 | 4 | 5 |
|---|---|---|---|---|---|---|
| MOVEMENT AMOUNT (UPWARD) | 0 | 1 | 2 | 3 | 4 | 5 |
| MOVEMENT AMOUNT (FORWARD) | 0 | 1 | 2 | 3 | 4 | 5 |

FIG.7

| OPERATION AMOUNT | 0 | 1 | 2 | 3 | 4 | 5 |
|---|---|---|---|---|---|---|
| MOVEMENT AMOUNT (UPWARD) | 0 | 1 | 2 | 3 | 4 | 5 |
| MOVEMENT AMOUNT (FORWARD) | 0 | 1.5 | 3 | 4.5 | 6 | 7.5 |

FIG.8

| OPERATION AMOUNT | 0 | 1 | 2 | 3 | 4 | 5 |
|---|---|---|---|---|---|---|
| MOVEMENT AMOUNT (UPWARD) | 0 | 0.5 | 1 | 1.5 | 2 | 2.5 |
| MOVEMENT AMOUNT (FORWARD) | 0 | 0.75 | 1.5 | 2.25 | 3 | 3.75 |

FIG.12
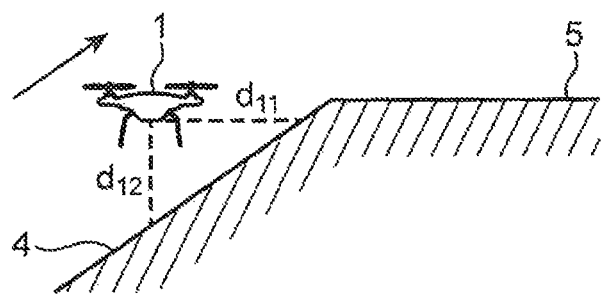
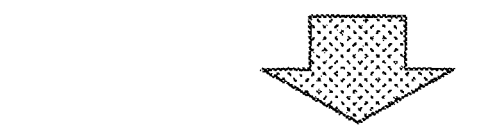
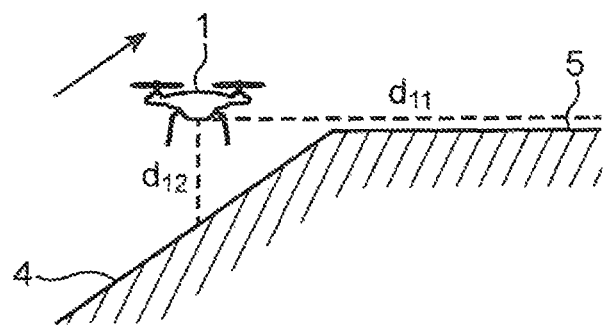
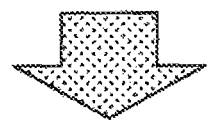
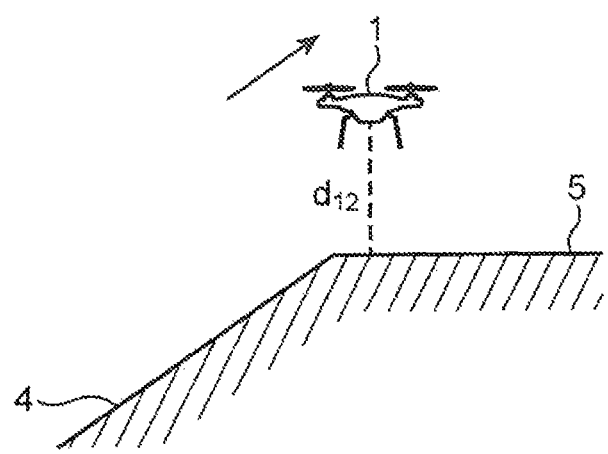

FIG.13
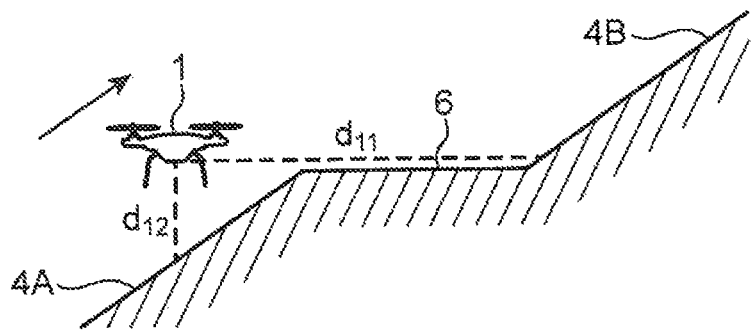
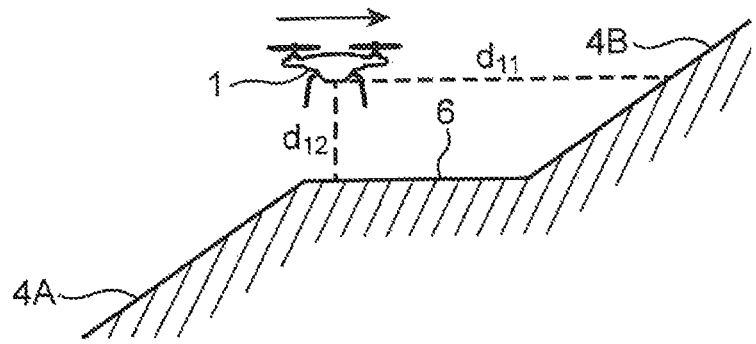
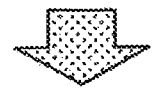
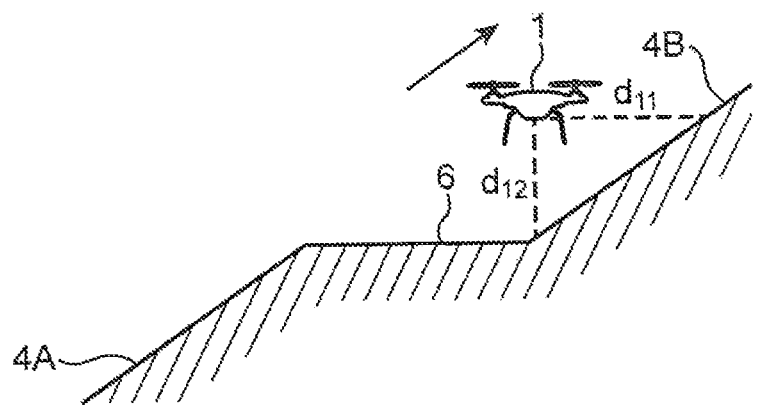

INFORMATION PROCESSING DEVICE FOR ASSISTING A REMOTE OPERATION OF AN UNMANNED AERIAL VEHICLE

FIELD OF THE INVENTION

The present disclosure relates to a technique of controlling movement of an unmanned aerial vehicle.

BACKGROUND ART

In recent years, remote control of small-sized unmanned aerial vehicles has become familiar. Such an unmanned aerial vehicle has a plurality of propellers. The unmanned aerial vehicle can fly in any manner by controlling the rotational speed of each of a plurality of propellers.

A controller is used for remote control of the unmanned aerial vehicle. A conventional controller includes two sticks. An operator operates the two sticks by right and left thumbs to remotely control the unmanned aerial vehicle.

When using the conventional controller, the operator needs to operate the two sticks to perform upward movement, downward movement, forward movement, rearward movement, left rotation, right rotation, leftward movement, and rightward movement. Such complicated operations make it difficult to control the unmanned aerial vehicle, especially for a beginner, and thus requires sufficient training. For example, Japanese Unexamined Patent Publication No. H5-317528 A discloses a technique of making the control easier.

However, it is still difficult, using this conventional technique, to assist operation of the unmanned aerial vehicle moving in a diagonal direction. Further improvement is yet to be needed.

SUMMARY OF THE INVENTION

The present disclosure has been made to solve the above-mentioned problem. An object of the present disclosure is to provide a technique that provides assistance in operating an unmanned aerial vehicle moving in a diagonal direction and easiness to operate the unmanned aerial vehicle.

An information processing device according to one aspect of the present disclosure includes a distance obtaining unit that obtains a first horizontal distance and a first vertical distance which are respectively a component in a horizontal direction and a component in a vertical direction among distances from the unmanned aerial vehicle to a surface of a particular place where elevation gradually increases or decreases along a horizontal direction, a decision unit that decides, based on a ratio of the first horizontal distance to the first vertical distance, a movement amount by which the unmanned aerial vehicle is to be moved simultaneously in the horizontal direction and the vertical direction, and a movement control unit that moves the unmanned aerial vehicle based on the movement amount.

According to the present disclosure, assistance in operating an unmanned aerial vehicle moving in a diagonal direction and easiness to operate the unmanned aerial vehicle can be provided.

BRIEF DESCRIPTION OF THE DRAWINGS

FIG. 6 illustrates an example of initial movement amount information according to the embodiment of the present disclosure.

FIG. 7 illustrates an example of set movement amount information according to the embodiment of the present disclosure.

FIG. 8 illustrates an example of the set movement amount information according to a modification of the embodiment of the present disclosure.

FIG. 12 is a schematic view for explaining flight control processing for the unmanned aerial vehicle moving near the top of a slope according to the embodiment of the present disclosure.

FIG. 13 is a schematic view for explaining the flight control processing for the unmanned aerial vehicle moving along a first slope, a level surface continuing from the first slope, and a second slope continuing from the level surface according to the embodiment of the present disclosure.

Figure 1:
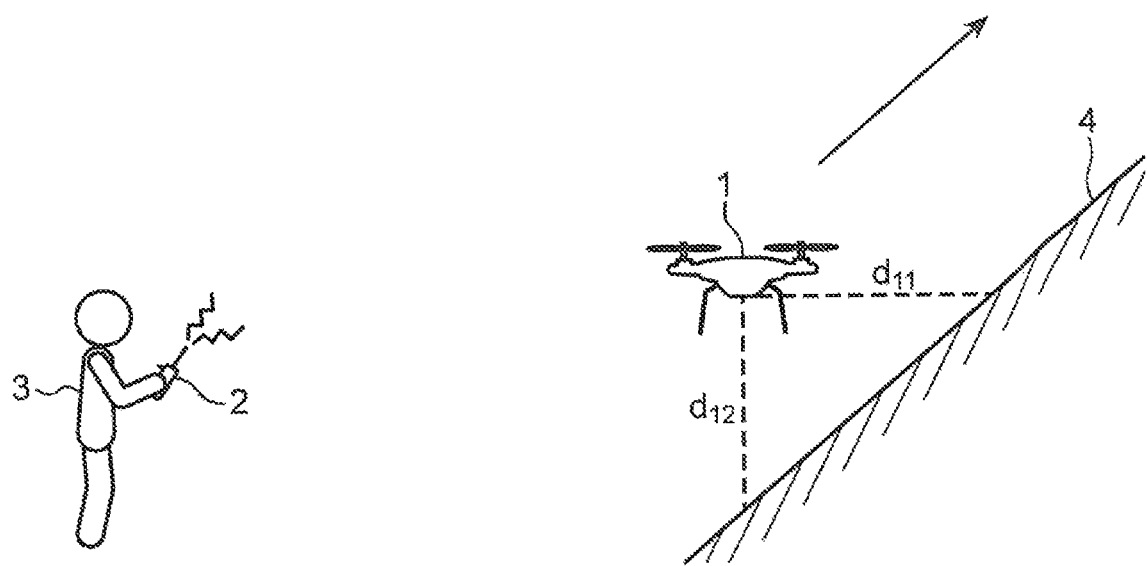
FIG. 1 is an external view illustrating a configuration of a flight control system according to an embodiment of the present disclosure.

DESCRIPTION OF EMBODIMENTS (Knowledge Underlying Present Disclosure)

When an unmanned aerial vehicle moves above a slope, such as a sloping road or stairs, moving the unmanned aerial vehicle along the slope is more efficient than moving the unmanned aerial vehicle upward and then forward because the distance of movement will be smaller.

There are two operation methods, referred to as mode 1 and mode 2, for a controller having two sticks. In the operation method of mode 1, movement in the front-and-rear direction and rotations are operated by the left stick and movement in the up-and-down direction and movement in the right-and-left direction are operated by the right stick. Meanwhile, in the operation method of mode 2, movement in the up-and-down direction and rotations are operated by the left stick and movement in the front-and-rear direction and movement in the right-and-left direction are operated by the right stick. For example, to move the unmanned aerial vehicle in a diagonally upward direction, both the left and right sticks are tilted forward in the operation method of mode 1 as well as in the mode 2.

However, to move the unmanned aerial vehicle along the slope, the operation amount of the two sticks needs to be properly adjusted to the angle of the slope, which is difficult especially for a beginner and thus requires sufficient training.

For example, a model airplane for spreading repellent or the like described in the conventional technique includes a flying height sensor that detects the flying height above a targeted crop or the like, and a control unit that compares the detected result of the flying height sensor and a previously set height and outputs a signal to a flying height adjustment driving unit to keep a proper height.

Described in this conventional technique is the assistance in controlling the flying direction (front-and-rear direction) but not the assistance in controlling the up-and-down direction. Both the front-and-rear direction and up-and-down direction need to be controlled to fly the unmanned aerial vehicle along a slope, such as a sloping road and stairs.

To solve the abovementioned problem, an information processing device according to one aspect of the present disclosure includes a distance obtaining unit that obtains a first horizontal distance and a first vertical distance which are respectively a component in a horizontal direction and a component in a vertical direction among distances from the unmanned aerial vehicle to a surface of a particular place where elevation gradually increases or decreases along a horizontal direction, a decision unit that decides, based on a ratio of the first horizontal distance to the first vertical distance, a movement amount by which the unmanned aerial vehicle is to be moved simultaneously in the horizontal direction and the vertical direction, and a movement control unit that moves the unmanned aerial vehicle based on the movement amount.

In this configuration, the unmanned aerial vehicle moves along the surface of the particular place where elevation gradually increases or decreases along the horizontal direction, that is, operation of the unmanned aerial vehicle moving in a diagonal direction can be assisted, making the operation of the unmanned aerial vehicle easy.

In this information processing device, the decision unit may decide the movement amount based on an operation amount which is input to a controller that receives a control of the unmanned aerial vehicle by an operator, and the ratio.

In this configuration, the movement amount is decided based on the operation amount, which is input to the controller receiving control of the unmanned aerial vehicle by the operator, and the ratio. Thus, the movement amount of the unmanned aerial vehicle can be changed according to the operation amount given to the controller, which makes the unmanned aerial vehicle move at a speed intended by the operator.

This information processing device may further include a posture obtaining unit that obtains a posture of the moving unmanned aerial vehicle, in which the distance obtaining unit may obtain a second horizontal distance and a second vertical distance measured when the unmanned aerial vehicle is taking the posture, the second horizontal distance and the second vertical distance respectively being a component in a horizontal direction and a component in a vertical direction among distances from the unmanned aerial vehicle to the surface of the particular place, and the distance obtaining unit may calculate the first horizontal distance and the first vertical distance based on the posture of the unmanned aerial vehicle, the second horizontal distance, and the second vertical distance.

In this configuration, the first horizontal distance and the first vertical distance are calculated based on the posture of the moving unmanned aerial vehicle, the second horizontal distance, and the second vertical distance, so that even when the unmanned aerial vehicle tilts while moving, the unmanned aerial vehicle can be moved along the surface of the particular place.

In this information processing device, the decision unit may redecide the movement amount when one of the first horizontal distance and the first vertical distance becomes equal to or less than a threshold value.

In this configuration, the movement amount is redecided when one of the first horizontal distance and the first vertical distance becomes equal to or less than the threshold value, so that even when the sloping angle of the surface of the particular place changes while the unmanned aerial vehicle is moving, the unmanned aerial vehicle can be moved along the surface of the particular place.

In this information processing device, the movement control unit may fix the movement amount until the unmanned aerial vehicle arrives at an end limit of the particular place when the first horizontal distance becomes equal to or larger than the threshold value or when the first horizontal distance is not obtained.

When the unmanned aerial vehicle is moving diagonally upward above the particular place and approaches the end limit of the particular place, the first horizontal distance becomes equal to or larger than the threshold value or unobtainable. When this happens, a correct ratio of the first horizontal distance to the first vertical distance cannot be obtained, which makes it difficult to continue moving the unmanned aerial vehicle to the end limit of the particular place. However, in this configuration, when the first horizontal distance becomes equal to or larger than the threshold value or unobtainable, the movement amount is fixed until the unmanned aerial vehicle arrives at the end limit of the particular place, so that the unmanned aerial vehicle can continue moving to the end limit of the particular place.

In this information processing device, the distance obtaining unit may obtain the first horizontal distance and the first vertical distance which are periodically measured while the unmanned aerial vehicle is moving, the movement control unit may move the unmanned aerial vehicle in the horizontal direction, the first horizontal distance and the first vertical distance being obtained while the unmanned aerial vehicle is moving, move the unmanned aerial vehicle to a first point when the first vertical distance changes while the unmanned aerial vehicle is moving in the horizontal direction, the first point being a point where the unmanned aerial vehicle has been located immediately before the change, move the unmanned aerial vehicle in the vertical direction from the first point, the first horizontal distance and the first vertical distance being obtained while the unmanned aerial vehicle is moving, and move the unmanned aerial vehicle to a second point when the first horizontal distance changes while the unmanned aerial vehicle is moving in the vertical direction, the second point being a point where the unmanned aerial vehicle has been located immediately before the change, and the distance obtaining unit may obtain the first horizontal distance and the first vertical distance at the second point.

For such a particular place as stairs, for example, the obtained first horizontal distance and first vertical distance take different values depending on the point where the unmanned aerial vehicle exists above the stairs. However, in this configuration, even for such a particular place as stairs, for example, the point at which the first horizontal distance and the first vertical distance are obtained above the stairs is previously determined, so that the unmanned aerial vehicle can be moved along the stairs without crashing into the stairs.

In this information processing device, the distance obtaining unit may obtain the first horizontal distance and the first vertical distance periodically measured while the unmanned aerial vehicle is moving, the information processing device may further include a determination unit that determines whether the unmanned aerial vehicle is located above the particular place based on the first horizontal distance and the first vertical distance is further included, and the decision unit may decide the movement amount when it is determined that the unmanned aerial vehicle is located above the particular place.

In this configuration, when the moving unmanned aerial vehicle arrives above the particular place where elevation gradually increases or decreases along the horizontal direction, the movement amount is automatically decided and thus the unmanned aerial vehicle can be moved along the surface of the particular place.

This information processing device may further include a presenting unit that presents positional relationship between the surface of the particular place and the unmanned aerial vehicle based on the first horizontal distance and the first vertical distance.

In this configuration, the positional relationship between the surface of the particular place and the unmanned aerial vehicle is presented based on the first horizontal distance and the first vertical distance, so that the operator can recognize where the unmanned aerial vehicle is located relative to the particular place.

In this information processing device, the unmanned aerial vehicle may include an image capturing device, and the information processing device may further include a setting unit that sets a moving direction of the unmanned aerial vehicle based on the movement amount to a direction in which the image capturing device captures an image.

In this configuration, an image in the moving direction of the unmanned aerial vehicle is captured, so that the operator can see the moving direction of the unmanned aerial vehicle while controlling the unmanned aerial vehicle.

An information processing method according to another aspect of the present disclosure is performed by a processer and includes obtaining a first horizontal distance and a first vertical distance which are respectively a component in a horizontal direction and a component in a vertical direction among distances from the unmanned aerial vehicle to a surface of a particular place where elevation gradually increases or decreases along a horizontal direction, deciding, based on a ratio of the first horizontal distance to the first vertical distance, a movement amount by which the unmanned aerial vehicle is to be moved simultaneously in the horizontal direction and the vertical direction, and moving the unmanned aerial vehicle based on the movement amount.

In this configuration, the unmanned aerial vehicle moves along the surface of the particular place where elevation gradually increases or decreases along the horizontal direction, that is, operation of the unmanned aerial vehicle moving in a diagonal direction can be assisted, making the operation of the unmanned aerial vehicle easy.

An unmanned aerial vehicle according to another aspect of the present disclosure includes a measuring unit that measures a first horizontal distance and a first vertical distance which are respectively a component in a horizontal direction and a component in a vertical direction among distances from the unmanned aerial vehicle to a surface of a particular place where elevation gradually increases or decreases along a horizontal direction, and the information processing device according to any one of the above. In this configuration, the information processing device can be applied to the unmanned aerial vehicle.

Embodiments of the present disclosure will be described with reference to the attached drawings. It should be noted that, the embodiments described below are specific examples for embodying the present disclosure and thus do not limit the technical scope of the present disclosure.

EMBODIMENTS

FIG. 1 is an external view illustrating a configuration of a flight control system according to an embodiment of the present disclosure. The flight control system illustrated in FIG. 1 includes an unmanned aerial vehicle 1 and a controller 2.

The controller 2 is operated by an operator 3 to remotely control the unmanned aerial vehicle 1. The controller 2 transmits control information for controlling the unmanned aerial vehicle 1 to the unmanned aerial vehicle 1 by radio, for example.

The unmanned aerial vehicle 1 is, for example, a drone. The unmanned aerial vehicle 1 is remotely controlled by the operator 3 using the controller 2. The unmanned aerial vehicle 1 flies by radio control. The unmanned aerial vehicle 1 receives the control information from the controller 2 and flies according to the received control information. The unmanned aerial vehicle 1 moves diagonally upward or diagonally downward along a slope 4, such as a sloping road and stairs.

Figure 2:
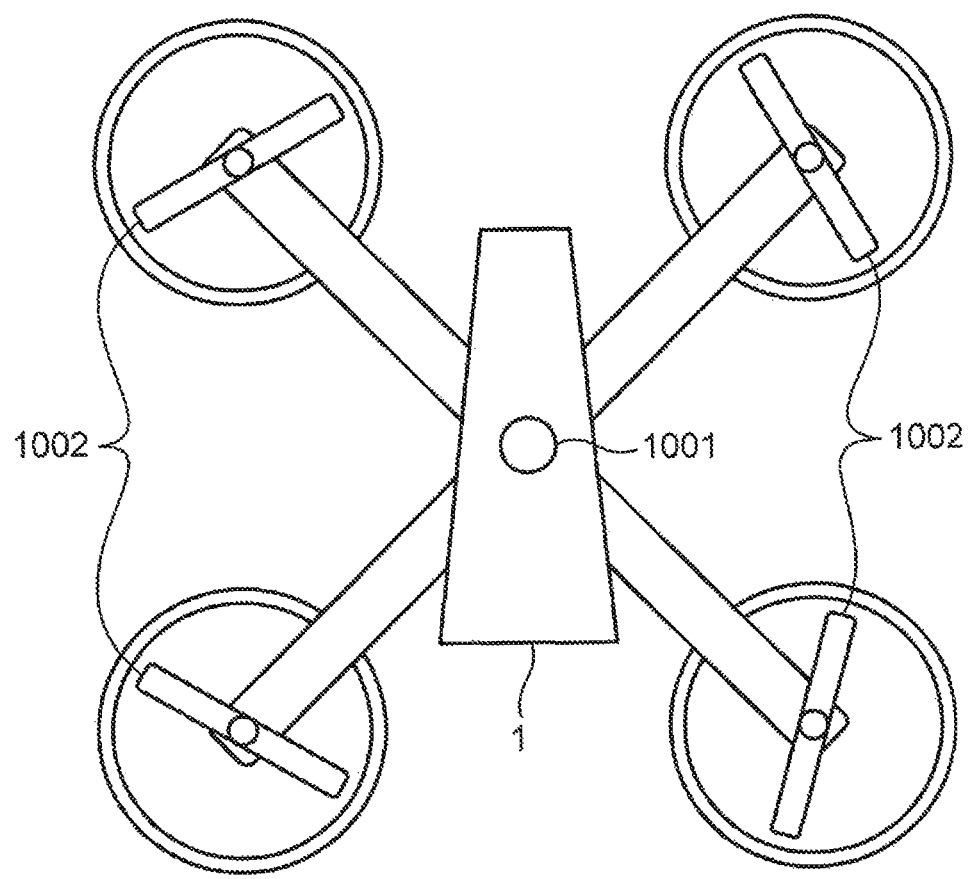
FIG. 2 is a general view illustrating an example of an unmanned aerial vehicle according to the embodiment of the present disclosure.
Figure 3:
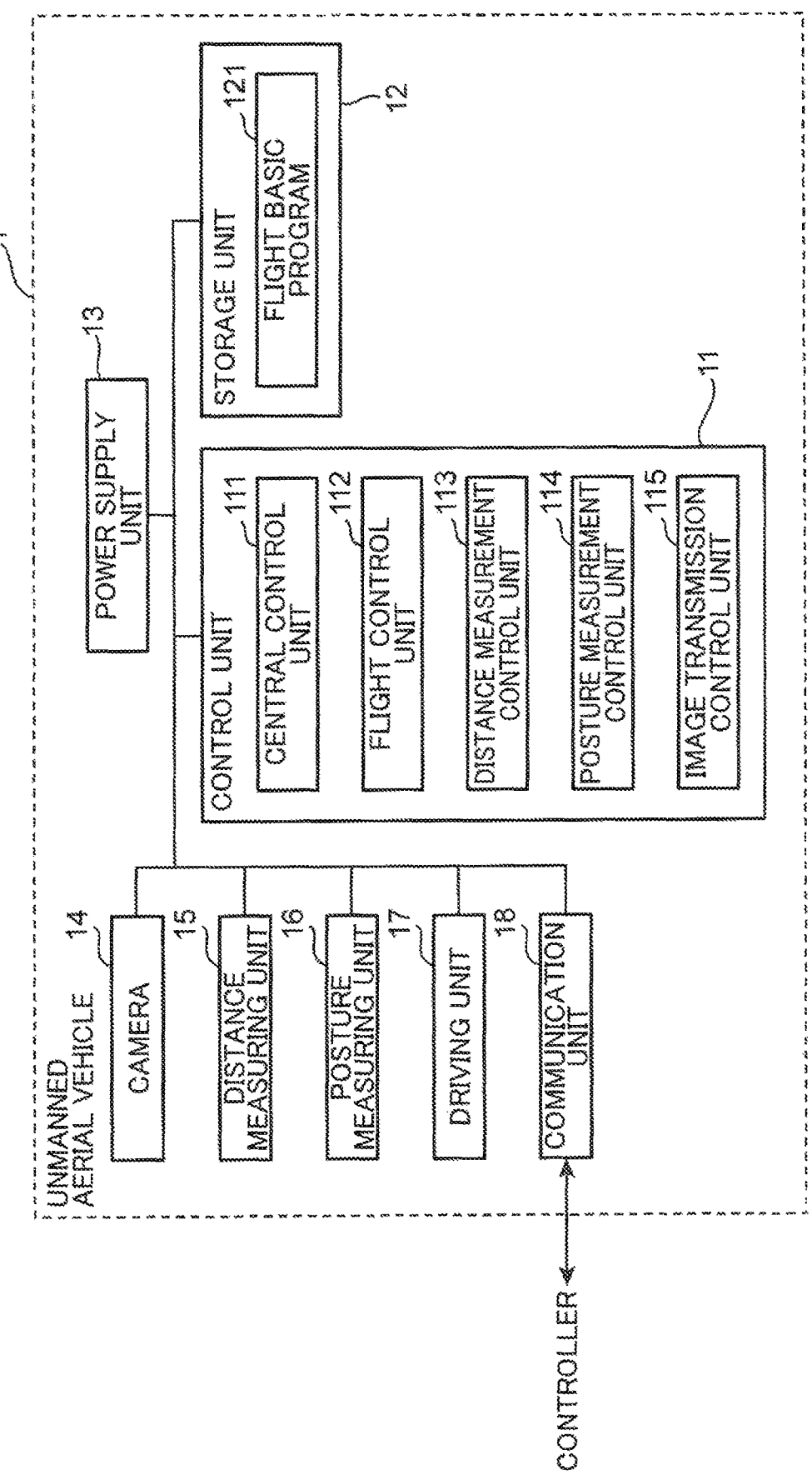
FIG. 3 is a block diagram of a configuration of the unmanned aerial vehicle according to the embodiment of the present disclosure.

FIG. 2 is a general view illustrating an example of the unmanned aerial vehicle according to the embodiment of the present disclosure. FIG. 3 is a block diagram of a configuration of the unmanned aerial vehicle according to the embodiment of the present disclosure.

As illustrated in FIG. 2, the unmanned aerial vehicle 1 includes at least sensors 1001 of various types, and propelling units 1002. A control unit 11, a storage unit 12, a power supply unit 13, a camera 14, a distance measuring unit 15, a posture measuring unit 16, a driving unit 17, and a communication unit 18 are housed inside the unmanned aerial vehicle 1.

The sensors 1001 of various types, such as an image sensor and a distance sensor, are arbitrarily installed as required by the intended use of the unmanned aerial vehicle 1.

The propelling units 1002 each include a propeller for generating lift, thrust, and torque for flying the unmanned aerial vehicle 1, and a motor that rotates the propeller. In the example in FIG. 2, the unmanned aerial vehicle 1 includes four propelling units 1002. The number of the propelling units 1002 however may be five or more.

The unmanned aerial vehicle 1 illustrated in FIG. 3 includes the control unit 11, the storage unit 12, the power supply unit 13, the camera 14, the distance measuring unit 15, the posture measuring unit 16, the driving unit 17, and the communication unit 18.

The power supply unit 13 is a power source for the unmanned aerial vehicle 1, and supplies power to each part from a storage battery (not shown) included in the unmanned aerial vehicle 1.

The camera 14 attached to the unmanned aerial vehicle 1 captures an image seen from the unmanned aerial vehicle 1. The camera 14 captures an image in the moving direction of the unmanned aerial vehicle 1, and outputs the captured image.

The distance measuring unit 15 is a distance sensor, for example. The distance measuring unit 15 measures a first horizontal distance $d_{11}$, which is a component in the horizontal direction, and a first vertical distance $d_{12}$, which is a component in the vertical direction, among the distances from the unmanned aerial vehicle 1 to the surface of a particular place where elevation gradually increases or decreases along the horizontal direction. The particular place is a sloping road or stairs, for example. The distance measuring unit 15 includes a light source that emits light, a light receiving unit that receives light reflected by a target to be measured, and a calculating unit that measures the time in which the light is emitted from the light source, reflected by the target to be measured, and received by the light receiving unit and calculates, from the measured time, the distance from the light source to the target to be measured. The distance measuring unit 15 measures, in a state where the front face of the unmanned aerial vehicle 1 is facing the slope 4, the first horizontal distance $d_{11}$, which is the component in the horizontal direction, and the first vertical distance $d_{12}$, which is the component in the vertical direction, among the distances from the unmanned aerial vehicle 1 to the slope 4.

It should be noted that, the distance measuring unit 15 measures the distance between the unmanned aerial vehicle 1 and a target existing in the forward, horizontal direction from the unmanned aerial vehicle 1. The distance measuring unit 15 also measures the distance between the unmanned aerial vehicle 1 and a target existing in the downward, vertical direction from the unmanned aerial vehicle 1.

The distance measuring unit 15 may also measure the distance between the unmanned aerial vehicle 1 and a target existing in the rearward, horizontal direction from the unmanned aerial vehicle 1. This allows the distance measuring unit 15, when the unmanned aerial vehicle 1 is moving diagonally downward and the rear face of the unmanned aerial vehicle 1 is facing the slope 4, to measure the first horizontal distance $d_{11}$, which is the component in the horizontal direction, and the first vertical distance $d_{12}$, which is the component in the vertical direction, among the distances from the unmanned aerial vehicle 1 to the slope 4.

After the unmanned aerial vehicle 1 has started moving in the diagonal direction along the slope, the distance measuring unit 15 measures a second horizontal distance, which is a component in the horizontal direction, and a second vertical distance, which is a component in the vertical direction, among the distances from the unmanned aerial vehicle 1 to the slope 4.

The posture measuring unit 16, for example, a gyro sensor, measures the posture of the unmanned aerial vehicle 1. Specifically, the posture measuring unit 16 detects angles of the unmanned aerial vehicle 1. The angles of the unmanned aerial vehicle 1 include pitch angle, roll angle, and yaw angle. The pitch angle is an angle about a pitch axis, indicating an angle of the unmanned aerial vehicle 1 regarding the front-and-rear direction. The roll angle is an angle about a roll axis, indicating an angle of the unmanned aerial vehicle 1 regarding the right-and-left direction. The yaw angle is an angle about a yaw axis, indicating a rotation angle of the unmanned aerial vehicle 1 regarding the left-and-right direction. The posture measuring unit 16 measures the posture of the moving unmanned aerial vehicle 1.

The driving unit 17 drives each of a plurality of propelling units 1002 that fly the unmanned aerial vehicle 1. The driving unit 17 rotates a plurality of propellers that fly the unmanned aerial vehicle 1.

The communication unit 18 transmits various pieces of information to the controller 2 and receives various pieces of information from the controller 2 by radio. The communication unit 18 receives, from the controller 2, control information for controlling the unmanned aerial vehicle 1. The communication unit 18 receives a distance measurement command signal from the controller 2. The communication unit 18 transmits the first horizontal distance $d_{11}$ and the first vertical distance $d_{12}$ measured by the distance measuring unit 15 to the controller 2. The communication unit 18 also transmits the posture of the unmanned aerial vehicle 1 measured by the posture measuring unit 16 to the controller 2. The communication unit 18 also transmits an image captured by the camera 14 to the controller 2.

The control unit 11, for example, a central processing unit (CPU), controls an operation of the unmanned aerial vehicle 1. The control unit 11 includes a central control unit 111, a flight control unit 112, a distance measurement control unit 113, a posture measurement control unit 114, and an image transmission control unit 115.

The storage unit 12 is, for example, a semiconductor memory, and stores various pieces of information. The storage unit 12 stores flight basic program 121.

The central control unit 111 controls an operation of each of the units of the unmanned aerial vehicle 1. The flight basic program 121 is a program for controlling flight of the unmanned aerial vehicle 1.

The flight control unit 112 executes the flight basic program 121 to control flight of the unmanned aerial vehicle 1 remotely controlled by the operator. The flight control unit 112 controls flight of the unmanned aerial vehicle 1 according to the control information received by the communication unit 18. The flight control unit 112 also controls the posture of the unmanned aerial vehicle 1 based on the angle of the unmanned aerial vehicle 1 measured by the posture measuring unit 16.

The distance measurement control unit 113 commands the distance measuring unit 15, when the communication unit 18 has received the distance measurement command signal, to measure the first horizontal distance $d_{11}$, which is the component in the horizontal direction, and the first vertical distance $d_{12}$, which is the component in the vertical direction, among the distances from the unmanned aerial vehicle 1 to the slope. The distance measurement control unit 113 outputs the first horizontal distance $d_{11}$ and the first vertical distance $d_{12}$ measured by the distance measuring unit 15 to the communication unit 18.

After the unmanned aerial vehicle 1 has started moving in the diagonal direction along the slope, the distance measurement control unit 113 periodically commands the distance measuring unit 15 to measure the second horizontal distance and the second vertical distance.

The posture measurement control unit 114 commands the posture measuring unit 16 to measure the posture of the moving unmanned aerial vehicle 1. The posture measurement control unit 114 outputs the posture of the unmanned aerial vehicle 1 measured by the posture measuring unit 16 to the flight control unit 112 and the communication unit 18.

The image transmission control unit 115 transmits the image captured by the camera 14 to the controller 2 via the communication unit 18. The image transmission control unit 115 performs predetermined image processing on the image which has been output from the camera 14. The image transmission control unit 115 transmits the image on a real-time basis using the real time streaming protocol (RTSP), for example.

Figure 4:
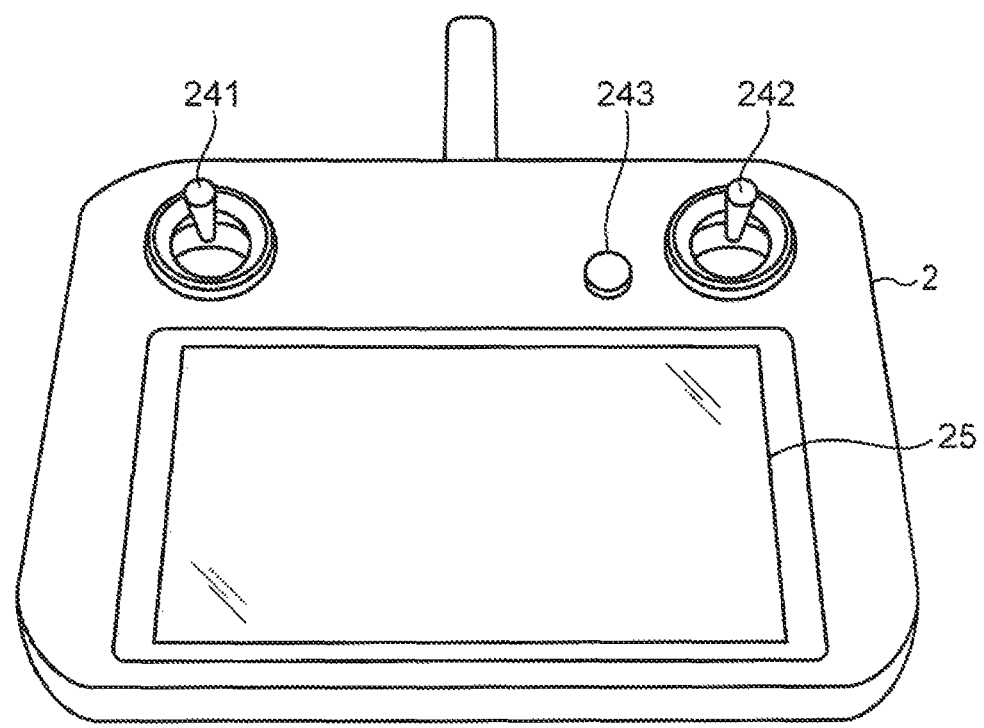
FIG. 4 is a general view illustrating an example of a controller according to the embodiment of the present disclosure.
Figure 5:
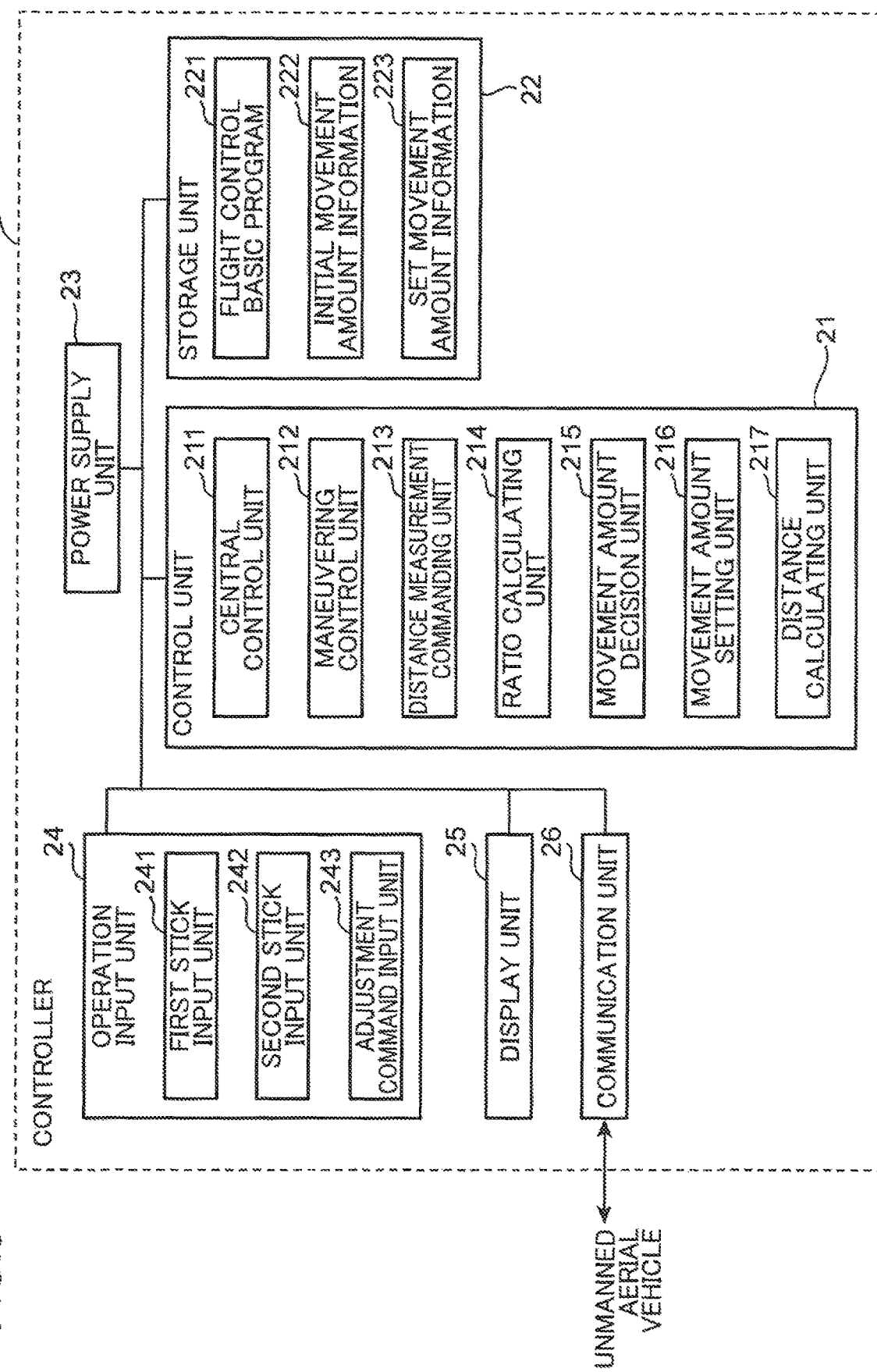
FIG. 5 is a block diagram of a configuration of the controller according to the embodiment of the present disclosure.

FIG. 4 is a general view illustrating an example of the controller according to the embodiment of the present disclosure. FIG. 5 is a block diagram of the configuration of the controller according to the embodiment of the present disclosure.

As illustrated in FIG. 4, a first stick input unit 241, a second stick input unit 242, an adjustment command input unit 243, and a display unit 25 are arranged on the surface of the controller 2.

The first stick input unit 241 is operated by the left thumb of the operator. The second stick input unit 242 is operated by the right thumb of the operator.

There are two operation methods for the controller 2, that is, mode 1 and mode 2. In the operation method of mode 1, movement in the front-and-rear direction and rotations of the unmanned aerial vehicle 1 are operated by the first stick input unit 241 in the left, and movement in the up-and-down direction and movement in the right-and-left direction of the unmanned aerial vehicle 1 are operated by the second stick input unit 242 in the right. Meanwhile, in the operation method of mode 2, movement in the up-and-down direction and rotations of the unmanned aerial vehicle 1 are operated by the first stick input unit 241, and movement in the front-and-rear direction and movement in the right-and-left direction of the unmanned aerial vehicle 1 are operated by the second stick input unit 242 in the right. As for the present embodiment, the operation method of mode 2 will exemplarily be described.

The adjustment command input unit 243 receives, from the operator, an input of commanding adjustment of movement amount. The adjustment command input unit 243 is, for example, a button, and is pushed by the operator to move the unmanned aerial vehicle 1 in the diagonally upward or downward direction along the slope. It should be noted that, the adjustment command input unit 243 may include a first adjustment command input unit that receives, from the operator, an input of commanding adjustment of movement amount for the diagonally upward movement, and a second adjustment command input unit that receives, from the operator, an input of commanding adjustment of movement amount for the diagonally downward movement.

The display unit 25 is, for example, a liquid crystal displaying device, and presents various pieces of information as well as the image captured by the camera 14 of the unmanned aerial vehicle 1.

The controller 2 illustrated in FIG. 5 includes a control unit 21, a storage unit 22, a power supply unit 23, an operation input unit 24, the display unit 25, and a communication unit 26.

The power supply unit 23 is a power source for the controller 2, and supplies power to each of the units from a storage battery (not shown) included in the controller 2.

The operation input unit 24 receives an operation input from the operator. The operation input unit 24 includes the first stick input unit 241 provided on the left-hand side of the operator, the second stick input unit 242 provided on the right-hand side of the operator, and the adjustment command input unit 243. When the first stick input unit 241 and the second stick input unit 242 are tilted by the operator, the first stick input unit 241 and the second stick input unit 242 each outputs the tilt direction and the operation amount corresponding to the tilt angle to the control unit 21. The movement of the unmanned aerial vehicle 1 is controlled according to the tilt directions and the tilt angles of the first stick input unit 241 and the second stick input unit 242. The control information includes the tilt directions and the operation amounts of the first stick input unit 241 and the second stick input unit 242, The operation amount is indicated by six levels, "0" to "6", corresponding to the tilt angle.

In the operation method of mode 2, tilting the first stick input unit 241 forward (to the direction remote from the operator) moves the unmanned aerial vehicle 1 upward, and tilting the first stick input unit 241 rearward (to the direction toward the operator) moves the unmanned aerial vehicle 1 downward. Tilting the first stick input unit 241 leftward causes the unmanned aerial vehicle 1 to make a left rotation, and tilting the first stick input unit 241 rightward causes the unmanned aerial vehicle 1 to make a right rotation.

Meanwhile, in the operation method of mode 2, tilting the second stick input unit 242 forward (to the direction remote from the operator) moves the unmanned aerial vehicle 1 forward, and tilting the second stick input unit 242 rearward (to the direction toward the operator) moves the unmanned aerial vehicle 1 rearward. Tilting the second stick input unit 242 leftward moves the unmanned aerial vehicle 1 leftward, and tilting the second stick input unit 242 rightward moves the unmanned aerial vehicle 1 rightward.

It should be noted that, although the controller 2 includes the display unit 25 in the present embodiment, the present disclosure is not particularly limited to such a configuration. The controller 2 may present the image captured by the camera 14 of the unmanned aerial vehicle 1 on the display unit of a smartphone or tablet computer connected to, to communicate with, the controller 2. Alternatively, the controller 2 may not include the display unit 25.

The communication unit 26 transmits various pieces of information to the unmanned aerial vehicle 1 and receives various pieces of information from the unmanned aerial vehicle 1. The communication unit 26 transmits the control information to the unmanned aerial vehicle 1. The communication unit 26 transmits the distance measurement command signal to the unmanned aerial vehicle 1. After transmitting the distance measurement command signal to the unmanned aerial vehicle 1, the communication unit 26 receives the first horizontal distance $d_{11}$ and the first vertical distance $d_{12}$ from the unmanned aerial vehicle 1. That is, the communication unit 26 obtains the first horizontal distance $d_{11}$, which is the component in the horizontal direction, and the first vertical distance $d_{12}$, which is the component in the vertical direction, among the distances from the unmanned aerial vehicle 1 to the surface of the particular place where elevation gradually increases or decreases along the horizontal direction.

The communication unit 26 receives the posture of the moving unmanned aerial vehicle 1, the second horizontal distance, and the second vertical distance from the unmanned aerial vehicle 1. That is, the communication unit 26 obtains the posture of the moving unmanned aerial vehicle 1. The communication unit 26 also obtains the second horizontal distance, which is the component in the horizontal direction, and the second vertical distance, which is the component in the vertical direction, among the distances from the unmanned aerial vehicle 1 to the surface of the particular place, the second horizontal distance and the second vertical distance being measured when the unmanned aerial vehicle 1 is taking the posture while moving.

The control unit 21 is, for example, a CPU, and controls the operation of the controller 2. The control unit 21 includes a central control unit 211, a maneuvering control unit 212, a distance measurement commanding unit 213, a ratio calculating unit 214, a movement amount decision unit 215, a movement amount setting unit 216, and a distance calculating unit 217.

The storage unit 22 is, for example, a semiconductor memory, and stores various pieces of information. The storage unit 22 stores a flight control basic program 221, initial movement amount information 222, and set movement amount information 223.

The central control unit 211 controls the operations of each of the units of the controller 2. The flight control basic program 221 is a program for controlling the unmanned aerial vehicle 1.

The maneuvering control unit 212 executes the flight control basic program 221 to control the unmanned aerial vehicle 1. The maneuvering control unit 212 generates, according to an operation input given through the operation input unit 24, control information for controlling the unmanned aerial vehicle 1.

The distance measurement commanding unit 213 outputs, when the adjustment command input unit 243 has received the input of commanding adjustment of movement amount, the distance measurement command signal to the communication unit 26. To move the unmanned aerial vehicle 1 along the slope, the operator keeps the unmanned aerial vehicle 1 still with the front face (nose) of the unmanned aerial vehicle 1 facing the slope, and then pushes the adjustment command input unit 243. The adjustment command input unit 243 thereby receives the input of commanding adjustment of movement amount.

The ratio calculating unit 214 calculates the ratio of the first horizontal distance $d_{11}$ to the first vertical distance $d_{12}$, the first horizontal distance $d_{11}$ and the first vertical distance $d_{12}$ having been obtained by the communication unit 26.

The initial movement amount information 222 is table information in which the operation amount of each of the first stick input unit 241 and the second stick input unit 242 is associated with the initial value of the upward movement amount and the initial value of the forward movement amount.

FIG. 6 illustrates an example of the initial movement amount information according to the embodiment of the present disclosure.

As illustrated in FIG. 6, each of the operation amounts "0" to "5" of the first stick input unit 241 and the second stick input unit 242 is associated with one of the initial values "0" to "5" of the upward movement amount and one of the initial values "0" to "5" of the forward movement amount. For example, the operation amount "1" of the first stick input unit 241 gives the upward movement amount "1" of the unmanned aerial vehicle 1. The movement amount is indicated by six levels of "0" to "5". It should be noted that by what amount the unmanned aerial vehicle 1 is to be moved when given the movement amount of any one of "0" to "5" is previously stored in the storage unit 12 of the unmanned aerial vehicle 1.

The movement amount decision unit 215 decides, based on the ratio of the first horizontal distance $d_{11}$ to the first vertical distance $d_{12}$, the movement amount by which the unmanned aerial vehicle 1 is to be moved simultaneously in both the horizontal direction and vertical direction. The movement amount decision unit 215 decides the movement amount based on the operation amount which is input to the controller 2 receiving the control of the unmanned aerial vehicle 1 by the operator, and the ratio.

The movement amount setting unit 216 stores the movement amount decided by the movement amount decision unit 215 in the storage unit 22. The movement amount setting unit 216 stores, in the storage unit 22, the set movement amount information 223 in which the operation amount of each of the first stick input unit 241 and the second stick input unit 242 is associated with the upward movement amount and the forward movement amount decided by the movement amount decision unit 215.

The set movement amount information 223 is table information in which the operation amount of each of the first stick input unit 241 and the second stick input unit 242 is associated with the upward movement amount and the forward movement amount decided by the movement amount decision unit 215.

FIG. 7 illustrates an example of the set movement amount information according to the embodiment of the present disclosure. For example, when the first horizontal distance $d_{11}$ is 1.5 meters and the first vertical distance $d_{12}$ is 1 meter, the ratio calculating unit 214 calculates the ratio of the first horizontal distance $d_{11}$ to the first vertical distance $d_{12}$ to be 3:2. In this case, the movement amount decision unit 215 changes the initial value of the forward movement amount and the initial value of the upward movement amount so that the ratio of the forward movement amount to the upward movement amount becomes 3:2.

That is, as illustrated in FIG. 7, the movement amount decision unit 215 decides, respectively for the operation amounts "0" to "5" of the first stick input unit 241 and the second stick input unit 242, the upward movement amounts to be "0", "1", "2", "3", "4", and "5" and the forward movement amount to be "0", "1.5", "3", "4.5", "6", and "7.5". It should be noted that, in the present embodiment, the upward movement amount is decided to be the same value as the initial value, and the forward movement amount is decided to be the value resulting from multiplying the initial value by 3/2.

It should be noted that, although the operation amount takes a discrete value in the present embodiment, the operation amount may take a continuous value. Although the movement amount decision unit 215 decides the forward movement amount by taking the upward movement amount as reference in the present embodiment, the upward movement amount may be decided by taking the forward movement amount as reference. That is, although the movement amount decision unit 215 changes the forward movement amount from the initial value without changing the upward movement amount from the initial value in the present embodiment, the present disclosure is not particularly limited to this configuration. The movement amount decision unit 215 may change the upward movement amount from the initial value without changing the forward movement amount from the initial value. The movement amount decision unit 215 may change both the upward movement amount and forward movement amount from each initial value.

In the present embodiment, when the unmanned aerial vehicle 1 is to be moved diagonally upward along the slope, the first stick input unit 241 and the second stick input unit 242 are tilted by the same angle. That is, the unmanned aerial vehicle 1 moves diagonally upward along the slope when the first stick input unit 241 and the second stick input unit 242 are both tilted forward by the same operation amount.

In the present embodiment, when the unmanned aerial vehicle 1 is to be moved diagonally downward along the slope, the first stick input unit 241 and the second stick input unit 242 are tilted by the same angle. That is, the unmanned aerial vehicle 1 moves diagonally downward along the slope when the first stick input unit 241 is tilted rearward and the second stick input unit 242 is tilted forward by the same operation amount.

When the input is given by the first stick input unit 241 and the second stick input unit 242 by staged input amounts, the maneuvering control unit 212 starts moving the unmanned aerial vehicle 1 in the diagonal direction when the operation amounts of the first stick input unit 241 and the second stick input unit 242 are at the same stage.

The maneuvering control unit 212 may determine whether the operation amounts of the first stick input unit 241 and the second stick input unit 242 are the same. When it determined that the operation amounts of the first stick input unit 241 and the second stick input unit 242 are the same, the display unit 25 may provide a notification to the operator that the unmanned aerial vehicle 1 can be moved. The operation input unit 24 may also include a movement start button to command the unmanned aerial vehicle 1 to start moving. The maneuvering control unit 212 may start moving the unmanned aerial vehicle 1 in the diagonal direction when the notification that the unmanned aerial vehicle 1 can be moved is presented on the display unit 25 and the movement start button is pushed.

The maneuvering control unit 212 may switch the mode from a normal mode to a diagonal movement mode when the movement start button is pushed. In the diagonal movement mode, when the operation amounts of the first stick input unit 241 and the second stick input unit 242 are the same, the maneuvering control unit 212 moves the unmanned aerial vehicle 1 by the horizontal movement amount and the vertical movement amount according to the set movement amount information 223. In the diagonal movement mode, when the operation amounts of the first stick input unit 241 and the second stick input unit 242 are different, the maneuvering control unit 212 keeps the unmanned aerial vehicle 1 still. In the diagonal movement mode, the maneuvering control unit 212 may not receive such an operation that indicates a direction other than a diagonal direction. The maneuvering control unit 212 may switch the mode from the diagonal movement mode to the normal mode when the movement start button is pushed again. The maneuvering control unit 212 may switch the mode from the diagonal movement mode to the normal mode when such an operation that indicates a direction other than a diagonal direction is input.

The operation input unit 24 may include, in addition to the first stick input unit 241 and the second stick input unit 242, a third stick input unit for making diagonal movement. When the third stick input unit is tilted forward, the unmanned aerial vehicle 1 may move diagonally upward along the slope by the movement amount corresponding to the operation amount. When the third stick input unit is tilted rearward, the unmanned aerial vehicle 1 may move diagonally downward along the slope by the movement amount corresponding to the operation amount.

The operation input unit 24 may include an input button for making a diagonal movement. The push amount of the input button corresponds to the operation amount. When the input button is pushed, the unmanned aerial vehicle 1 may move diagonally upward or downward along the slope by the movement amount corresponding to the operation amount.

FIG. 8 illustrates an example of set movement amount information according to a modification of the embodiment of the present disclosure.

As illustrated in FIG. 8, the movement amount decision unit 215 may decide both the upward movement amount and forward movement amount to be smaller than each initial value. For example, the movement amount decision unit 215 may decide the upward movement amount to be ½ of the initial value and the forward movement amount to be a value resulting from multiplying the initial value by ¾.

As described above, when the unmanned aerial vehicle 1 is to be moved diagonally upward along the slope, the first stick input unit 241 and the second stick input unit 242 need to be operated simultaneously. This control is difficult compared to the case where only one of the first stick input unit 241 and the second stick input unit 242 is operated. Deciding the upward movement amount and the forward movement amount to be smaller than each initial value reduces the movement amount of the unmanned aerial vehicle 1 corresponding to the operation amount, making the control easier.

When both the upward movement amount and forward movement amount are each smaller than the initial value, the movement amount decision unit 215 may determine whether a maximum operation amount has continuously been input for a predetermined time. The movement amount decision unit 215 may increase the upward movement amount and the forward movement amount corresponding to each maximum operation amount when it is determined that the maximum operation amount has continuously been input for the predetermined time. For example, the movement amount decision unit 215 may decide the upward movement amount to be "3" and the forward movement amount to be "4.5" when it is determined that the maximum operation amount of "5" has been input continuously for five seconds. Furthermore, the movement amount decision unit 215 may increase the upward movement amount by 0.5 at every elapsed time of one second.

When the distance between the unmanned aerial vehicle 1 and the slope is large, the possibility of the unmanned aerial vehicle 1 crashing into the slope is low even when the movement amount corresponding to the operation amount is not small. In this regard, the movement amount decision unit 215 may decide the movement amount according to the first horizontal distance $d_{11}$ and the first vertical distance $d_{12}$. For example, the movement amount decision unit 215 may decide the movement amount to be smaller than the initial value when the first horizontal distance $d_{11}$ and the first vertical distance $d_{12}$ are each smaller than a threshold value.

The unmanned aerial vehicle 1 may be kept still when the operation amounts of the first stick input unit 241 and the second stick input unit 242 are different. Instead of simultaneously operating the first stick input unit 241 and the second stick input unit 242, only one of the first stick input unit 241 and the second stick input unit 242 may be operated.

The distance calculating unit 217 calculates the first horizontal distance $d_{11}$ and the first vertical distance $d_{12}$ based on the posture of the unmanned aerial vehicle 1, the second horizontal distance, and the second vertical distance.

The maneuvering control unit 212 moves the unmanned aerial vehicle 1 based on the movement amount decided by the movement amount decision unit 215. The maneuvering control unit 212 reads the upward movement amount and the forward movement amount corresponding to the operation amounts of the first stick input unit 241 and the second stick input unit 242 from the set movement amount information 223 in the storage unit 22, and generates the control information including the upward movement amount and the forward movement amount which have been read. Then, the maneuvering control unit 212 transmits the generated control information to the unmanned aerial vehicle 1 via the communication unit 26.

In the present embodiment, the controller 2 may be a smartphone or tablet computer. In this case, the operator operates the touch panel of the smartphone or tablet computer.

Now, movement amount adjusting processing which is performed before the unmanned aerial vehicle 1 according to the present embodiment starts to move will be described.

Figure 9:
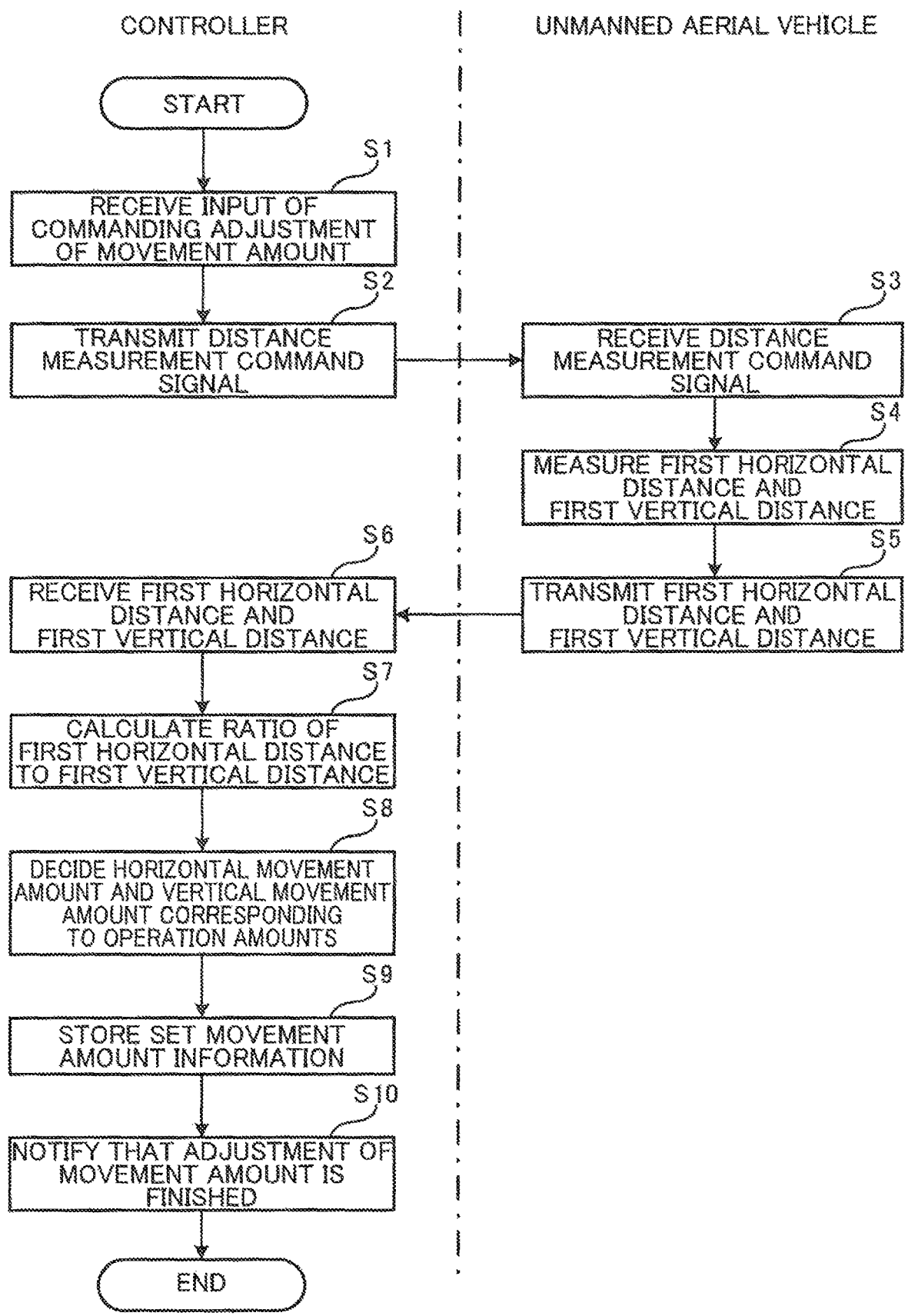
FIG. 9 is a flowchart for explaining movement amount adjusting processing performed before the unmanned aerial vehicle according to the embodiment of the present disclosure starts to move.

FIG. 9 is a flowchart for explaining the movement amount adjusting processing performed before the unmanned aerial vehicle according to the embodiment of the present disclosure starts to move.

First, in step S1, the adjustment command input unit 243 of the controller 2 receives an input, given by the operator, of commanding adjustment of movement amount. When the unmanned aerial vehicle 1 is to be moved along the slope, the operator moves the unmanned aerial vehicle 1 to an arbitrary place above the slope, and inputs a command to adjust the movement amount through the adjustment command input unit 243. When the unmanned aerial vehicle 1 is to be moved diagonally upward, the operator makes the front face (nose) of the unmanned aerial vehicle 1 face the slope. When the unmanned aerial vehicle 1 is to be moved diagonally downward, the operator makes the rear face (the side opposite to the nose) of the unmanned aerial vehicle 1 face the slope. When the distance measuring unit 15 of the unmanned aerial vehicle 1 measures only the horizontal distance from the front face of the unmanned aerial vehicle 1, the operator makes the front face (nose) of the unmanned aerial vehicle 1 face the slope even when the unmanned aerial vehicle 1 is to be moved diagonally downward.

Then, in step S2, the communication unit 26 transmits, to the unmanned aerial vehicle 1, the distance measurement command signal for commanding measurement of the first horizontal distance $d_{11}$, which is the component in the horizontal direction, and the first vertical distance $d_{12}$, which is the component in the vertical direction, among the distances from the unmanned aerial vehicle 1 to the slope. The distance measurement commanding unit 213 outputs, when the adjustment command input unit 243 has received the input of commanding adjustment of movement amount, the distance measurement command signal to the communication unit 26. The communication unit 26 transmits the distance measurement command signal, which has been input through the distance measurement commanding unit 213, to the unmanned aerial vehicle 1.

Then, in step S3, the communication unit 18 of the unmanned aerial vehicle 1 receives the distance measurement command signal, which has been transmitted by the controller 2.

Then, in step S4, the distance measuring unit 15 measures the first horizontal distance $d_{11}$, which is the component in the horizontal direction, and the first vertical distance $d_{12}$, which is the component in the vertical direction, among the distances from the unmanned aerial vehicle 1 to the slope. The distance measurement control unit 113 commands the distance measuring unit 15, when the communication unit 18 has received the distance measurement command signal, to measure the first horizontal distance $d_{11}$, which is the component in the horizontal direction, and the first vertical distance $d_{12}$, which is the component in the vertical direction, among the distances from the unmanned aerial vehicle 1 to the slope. Following the command given by the distance measurement control unit 113, the distance measuring unit 15 measures the first horizontal distance $d_{11}$, which is the component in the horizontal direction, and the first vertical distance $d_{12}$, which is the component in the vertical direction, among the distances from the unmanned aerial vehicle 1 to the slope. This vertical direction matches the direction of the gravitational force. This horizontal direction is perpendicular to the direction of the gravitational force. The distance measuring unit 15 outputs the measured first horizontal distance $d_{11}$ and first vertical distance $d_{12}$ to the distance measurement control unit 113. The distance measurement control unit 113 outputs the first horizontal distance $d_{11}$ and the first vertical distance $d_{12}$ which have been input from the distance measuring unit 15 to the communication unit 18.

Then, in step S5, the communication unit 18 transmits, to the controller 2, the first horizontal distance $d_{11}$, which is the component in the horizontal direction, and the first vertical distance $d_{12}$, which is the component in the vertical direction, which are among the distances from the unmanned aerial vehicle 1 to the slope and measured by the distance measuring unit 15.

Then, in step S6, the communication unit 26 of the controller 2 receives the first horizontal distance $d_{11}$, which is the component in the horizontal direction, and the first vertical distance $d_{12}$, which is the component in the vertical direction, which are among the distances from the unmanned aerial vehicle 1 to the slope and transmitted by the unmanned aerial vehicle 1.

Then, in step S7, the ratio calculating unit 214 calculates the ratio of the first horizontal distance $d_{11}$ to the first vertical distance $d_{12}$, the first horizontal distance $d_{11}$ and the first vertical distance $d_{11}$ having been received by the communication unit 26.

Then, in step S8, the movement amount decision unit 215 decides, based on the ratio of the first horizontal distance $d_{11}$ to the first vertical distance $d_{12}$ calculated by the ratio calculating unit 214, the horizontal movement amount and the vertical movement amount of the unmanned aerial vehicle 1 corresponding to the operation amounts of the first stick input unit 241 and the second stick input unit 242. When the unmanned aerial vehicle 1 is to be moved diagonally upward, the movement amount decision unit 215 decides the forward movement amount and the upward movement amount of the unmanned aerial vehicle 1 corresponding to the operation amounts of the first stick input unit 241 and the second stick input unit 242. When the unmanned aerial vehicle 1 is to be moved diagonally downward, the movement amount decision unit 215 decides the forward movement amount and the downward movement amount of the unmanned aerial vehicle 1 corresponding to the operation amounts of the first stick input unit 241 and the second stick input unit 242.

Then, in step S9, the movement amount setting unit 216 stores, in the storage unit 22, the set movement amount information 223 in which the operation amount of each of the first stick input unit 241 and the second stick input unit 242 is associated with the horizontal movement amount and the vertical movement amount decided by the movement amount decision unit 215.

Then, in step S10, the display unit 25 provides the operator with a notification that adjustment of movement amount has been finished. That is, the display unit 25 presents a notification screen that provides the notification that adjustment of movement amount has been finished. The operator checks the notification screen presented on the display unit 25, and starts operation to move the unmanned aerial vehicle 1 along the slope.

When the adjustment of movement amount has been finished and the first stick input unit 241 and the second stick input unit 242 are both tilted forward, the maneuvering control unit 212 reads, from the storage unit 22, the horizontal movement amount and the vertical movement amount associated with the operation amounts of the first stick input unit 241 and the second stick input unit 242. Then, the maneuvering control unit 212 generates the control information including the horizontal movement amount and the vertical movement amount which have been read, and transmits the control information to the unmanned aerial vehicle 1 via the communication unit 26. The communication unit 18 of the unmanned aerial vehicle 1 receives the control information. The flight control unit 112 moves the unmanned aerial vehicle 1 along the slope according to the horizontal movement amount and the vertical movement amount included in the received control information.

As the operator keeps the first stick input unit 241 and the second stick input unit 242 tilted forward, the unmanned aerial vehicle 1 moves diagonally upward by the horizontal movement amount and the vertical movement amount according to the set movement amount information 223 stored in the storage unit 22. Then, when the operator returns the first stick input unit 241 and the second stick input unit 242 each to its neutral position, the unmanned aerial vehicle 1 stops the diagonally upward movement. Alternatively, when the operator tilts at least one of the first stick input unit 241 and the second stick input unit 242 in a direction other than the forward direction, the unmanned aerial vehicle 1 stops the diagonally upward movement.

In this manner, the unmanned aerial vehicle 1 moves along the surface of the particular place where elevation gradually increases or decreases along the horizontal direction, that is, operation of the unmanned aerial vehicle 1 moving in a diagonal direction can be assisted, making the operation of the unmanned aerial vehicle 1 easy.

It should be noted that, the sloping angle of the slope, such as a sloping road, is not always constant. Thus, it is preferable that the controller 2 obtains the distance also while the unmanned aerial vehicle 1 is moving and updates the set movement amount information 223. It should also be noted that the unmanned aerial vehicle 1 moves forward with its nose down. Thus, the controller 2 is required to obtain the correct first horizontal distance $d_{11}$ and first vertical distance $d_{12}$ even when the unmanned aerial vehicle 1 is leaning forward.

Now, movement amount adjusting processing performed while the unmanned aerial vehicle 1 according to the present embodiment is moving will be described.

Figure 10:
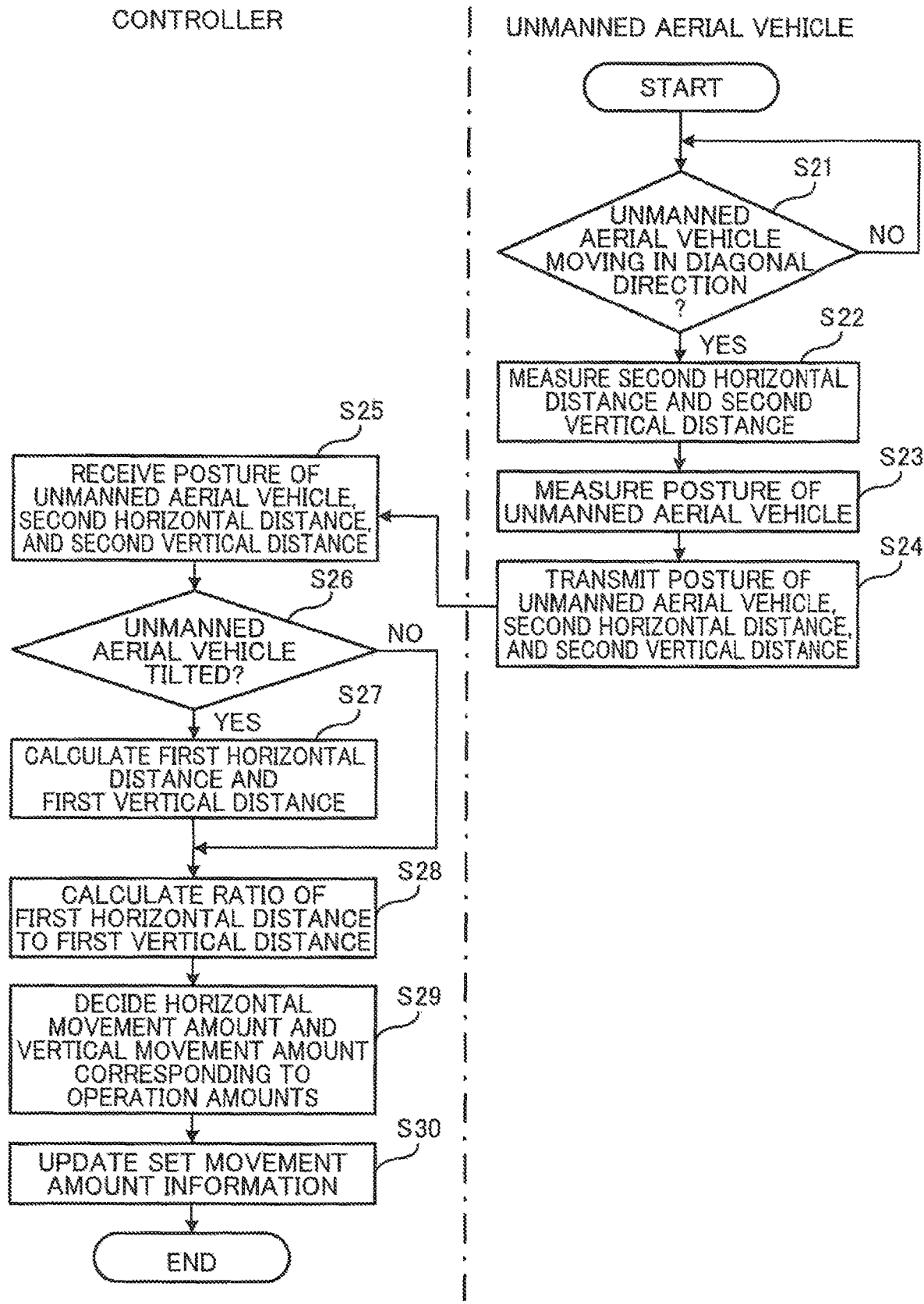
FIG. 10 is a flowchart for explaining the movement amount adjusting processing performed while the unmanned aerial vehicle according to the embodiment of the present disclosure is moving.

FIG. 10 is a flowchart for explaining the movement amount adjusting processing performed while the unmanned aerial vehicle according to the embodiment of the present disclosure is moving.

First, in step S21, the maneuvering control unit 212 of the unmanned aerial vehicle 1 determines whether the unmanned aerial vehicle is moving in a diagonal direction. When it is determined that the unmanned aerial vehicle is not moving in a diagonal direction (NO in step S21), the processing in step S21 is repeated.

When it is determined that the unmanned aerial vehicle is moving in a diagonal direction (YES in step S21), the distance measuring unit 15 measures the second horizontal distance, which is the component in the horizontal direction, and the second vertical distance, which is the component in the vertical direction, among the distances from the unmanned aerial vehicle 1 to the slope. When the unmanned aerial vehicle 1 is moving in a diagonal direction, the distance measurement control unit 113 commands the distance measuring unit 15 to measure the second horizontal distance, which is the component in the horizontal direction, and the second vertical distance, which is the component in the vertical direction, among the distances from the unmanned aerial vehicle 1 to the slope. Following the command given by the distance measurement control unit 113, the distance measuring unit 15 measures the second horizontal distance, which is the component in the horizontal direction, and the second vertical distance, which is the component in the vertical direction, among the distances from the unmanned aerial vehicle 1 to the slope. The distance measuring unit 15 outputs the measured second horizontal distance and second vertical distance to the distance measurement control unit 113. The distance measurement control unit 113 outputs the second horizontal distance and the second vertical distance which have been input from the distance measuring unit 15 to the communication unit 18. Since the moving unmanned aerial vehicle 1 leans forward as described above, the second vertical distance measured by the moving unmanned aerial vehicle 1 does not always match the first vertical distance $d_{12}$, which is along the direction of the gravitational force.

Then, in step S23, the posture measuring unit 16 measures the posture of the unmanned aerial vehicle 1. The posture of the unmanned aerial vehicle 1 indicates tilt angles of the unmanned aerial vehicle 1, at least the tilt angle regarding the front-and-rear direction of the unmanned aerial vehicle 1. The posture measurement control unit 114 commands the posture measuring unit 16 to measure the posture of the moving unmanned aerial vehicle 1. Following the command given by the posture measurement control unit 114, the posture measuring unit 16 measures the posture of the unmanned aerial vehicle 1. The posture measuring unit 16 outputs the measured posture of the unmanned aerial vehicle 1 to the posture measurement control unit 114. The posture measurement control unit 114 outputs the posture of the unmanned aerial vehicle 1, which has been input by the posture measuring unit 16, to the communication unit 18.

Then, in step S24, the communication unit 18 transmits the posture of the unmanned aerial vehicle 1, the second horizontal distance, and the second vertical distance to the controller 2.

Then, in step S25, the communication unit 26 of the controller 2 receives the posture of the unmanned aerial vehicle 1, the second horizontal distance, and the second vertical distance transmitted by the unmanned aerial vehicle 1.

Then, in step S26, the maneuvering control unit 212 determines, based on the posture of the unmanned aerial vehicle 1 received by the communication unit 26, whether the unmanned aerial vehicle 1 is tilted.

When it is determined that the unmanned aerial vehicle 1 is not tilted (NO in step S26), the ratio calculating unit 214 calculates, in step S28, the ratio of the second horizontal distance to the second vertical distance as the ratio of the first horizontal distance $d_{11}$ to the first vertical distance $d_{12}$, the second horizontal distance and the second vertical distance having been received by the communication unit 26.

Meanwhile, when it is determined that the unmanned aerial vehicle 1 is tilted (YES in step S26), the distance calculating unit 217 calculates, in step S27, the first horizontal distance $d_{11}$ and the first vertical distance $d_{12}$ based on the posture of the unmanned aerial vehicle 1, the second horizontal distance, and the second vertical distance.

Figure 11:
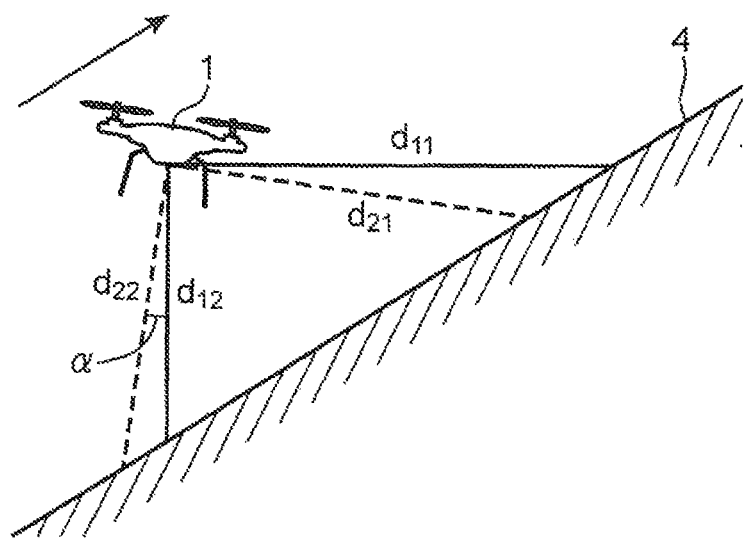
FIG. 11 is a schematic view for explaining a method of calculating, when the unmanned aerial vehicle is tilted, a first horizontal distance and a first vertical distance according to the embodiment of the present disclosure.

FIG. 11 is a schematic view for explaining a method of calculating the first horizontal distance and the first vertical distance when the unmanned aerial vehicle is tilted according to the embodiment of the present disclosure.

A tilt α of the unmanned aerial vehicle 1, the second horizontal distance $d_{21}$, and the second vertical distance $d_{22}$ are known. Thus, the distance calculating unit 217 calculates the first horizontal distance $d_{11}$ and the first vertical distance $d_{12}$ using the sine theorem. The first horizontal distance $d_{11}$ and the first vertical distance $d_{12}$ are calculated from the following equation (1) and equation (2).

$$d_{11}=d_{21}*\sin(180-\tan^{-1}(d_{22}/d_{21}))/\sin(\tan^{-1}(d_{22}/d_{21})-\alpha) \tag{1}$$

$$d_{12}=d_{21}*\sin(\tan^{-1}(d_{22}/d_{21}))/\sin(\alpha+\tan^{-1}(d_{21}/d_{22})) \tag{2}$$

Then, in step S28, the ratio calculating unit 214 calculates the ratio of the first horizontal distance $d_{11}$ to the first vertical distance $d_{12}$, the first horizontal distance $d_{11}$ and the first vertical distance $d_{12}$ having been calculated by the distance calculating unit 217.

Then, in step S29, the movement amount decision unit 215 decides, based on the ratio of the first horizontal distance $d_{ii}$ to the first vertical distance $d_{12}$ calculated by the ratio calculating unit 214, the horizontal movement amount and the vertical movement amount of the unmanned aerial vehicle 1 corresponding to the operation amounts of the first stick input unit 241 and the second stick input unit 242.

Then, in step S30, the movement amount setting unit 216 updates the set movement amount information 223 in which the operation amount of each of the first stick input unit 241 and the second stick input unit 242 is associated with the horizontal movement amount and the vertical movement amount decided by the movement amount decision unit 215.

In the present embodiment, the first horizontal distance $d_{11}$ along the direction perpendicular to the vertical direction and the first vertical distance $d_{12}$ along the vertical direction are calculated based on the tilt of the unmanned aerial vehicle 1, and the second horizontal distance and the second vertical distance having been measured when the unmanned aerial vehicle 1 is tilted. However, the present disclosure is not particularly limited to this configuration. The unmanned aerial vehicle 1 may include a plurality of distance measuring units that measure distances along different directions. For example, a plurality of distance measuring units may include a first distance measuring unit that measures the distance along the vertical direction and the distance along the horizontal direction, a second distance measuring unit that measures the distance along the direction tilted forward by 10 degrees from the vertical direction and the distance along the direction tilted forward by 10 degrees from the horizontal direction, and a third distance measuring unit that measures the distance along the direction tilted forward by 20 degrees from the vertical direction and the distance along the direction tilted forward by 20 degrees from the horizontal direction. The unmanned aerial vehicle 1 may specify, among a plurality of distance measuring units according to the tilt of the unmanned aerial vehicle 1, the distance measuring unit that can calculate the distance along the vertical direction, and transmit the first horizontal distance $d_{11}$ and the first vertical distance $d_{12}$ measured by the specified distance measuring unit to the controller 2.

The unmanned aerial vehicle 1 may include a distance measuring unit that tilts by its own weight to always measure the distance along the vertical direction and the distance along the horizontal direction perpendicular to the vertical direction. Furthermore, the unmanned aerial vehicle 1 may further include a driving unit that tilts the distance measuring unit according to the tilt of the unmanned aerial vehicle 1, and the driving unit may operate to make the distance measuring unit always measure the distance along the vertical direction and the distance along the horizontal direction perpendicular to the vertical direction.

In the present embodiment, the horizontal movement amount and the vertical movement amount of the moving unmanned aerial vehicle 1 are decided, and the set movement amount information is updated. However, it is not necessary to always update the set movement amount information when the unmanned aerial vehicle 1 is apart from the slope by a predetermined distance or more. In this regard, the movement amount decision unit 215 may redecide the movement amount when one of the first horizontal distance $d_{11}$ and the first vertical distance $d_{12}$ becomes equal to or less than a threshold value. When the unmanned aerial vehicle 1 moves diagonally upward, the movement amount decision unit 215 may determine whether the first horizontal distance $d_{11}$ is equal to or less than the threshold value and, when it is determined that the first horizontal distance $d_{11}$ is equal to or less than the threshold value, the movement amount decision unit 215 may redecide the movement amount. When the unmanned aerial vehicle 1 moves diagonally downward, the movement amount decision unit 215 may determine whether the first vertical distance die is equal to or less than the threshold value and, when it is determined that the first vertical distance $d_{12}$ is equal to or less than the threshold value, the movement amount decision unit 215 may redecide the movement amount. In this manner, the movement amount is redecided and the set movement amount information is updated only when the unmanned aerial vehicle 1 comes close to the slope, which reduces the amount of processing.

The movement amount may be redecided when the unmanned aerial vehicle 1 is apart from the slope by a predetermined distance or more. That is, the movement amount decision unit 215 may redecide the movement amount when one of the first horizontal distance $d_{11}$ and the first vertical distance $d_{12}$ becomes equal to or larger than the threshold value. This prevents the unmanned aerial vehicle 1 from gradually moving further apart from the slope, and thus makes the unmanned aerial vehicle 1 move along the slope.

When the unmanned aerial vehicle 1 moves indoors, the unmanned aerial vehicle 1 might crash not only into the slope but also into the ceiling. In this regard, the distance measuring unit 15 may measure a third horizontal distance, which is the component in the horizontal direction, and a third vertical distance, which is the component in the vertical direction, among the distances from the unmanned aerial vehicle 1 to the surface of the ceiling. The communication unit 26 of the controller 2 may obtain the third horizontal distance, which is the component in the horizontal direction, and the third vertical distance, which is the component in the vertical direction, among the distances from the unmanned aerial vehicle 1 to the surface of the ceiling. The movement amount decision unit 215 may redecide the movement amount when one of the third horizontal distance, which is the component in the horizontal direction, and the third vertical distance, which is the component in the vertical direction, among the distances from the unmanned aerial vehicle 1 to the surface of the ceiling becomes equal to or less than a threshold value. When the unmanned aerial vehicle 1 moves diagonally upward, the movement amount decision unit 215 may determine whether the third vertical distance, which is the component in the vertical direction, among the distances from the unmanned aerial vehicle 1 to the surface of the ceiling is equal to or less than the threshold value and, when it is determined that the third vertical distance is equal to or less than the threshold value, the movement amount decision unit 215 may redecide the movement amount. When the unmanned aerial vehicle 1 moves diagonally downward, the movement amount decision unit 215 may determine whether the third horizontal distance, which is the component in the horizontal direction, among the distances from the unmanned aerial vehicle 1 to the surface of the ceiling is equal to or less than the threshold value and, when it is determined that the third vertical distance is equal to or less than the threshold value, the movement amount decision unit 215 may redecide the movement amount. This prevents the unmanned aerial vehicle 1 from coming close to the ceiling.

In the present embodiment, the movement amount is redecided while the unmanned aerial vehicle 1 is moving. However, the present disclosure is not particularly limited to this configuration. The movement amount may be redecided while the unmanned aerial vehicle 1 is kept still in a hovering state. In this case, the unmanned aerial vehicle 1 is not tilted, so that the accuracy of measuring the first horizontal distance $d_{11}$ and the first vertical distance $d_{12}$ can be improved.

Now, flight control processing for the unmanned aerial vehicle 1 moving near the top of the slope will be described.

FIG. 12 is a schematic view for explaining the flight control processing for the unmanned aerial vehicle moving near the top of a slope according to the embodiment of the present disclosure.

In the present embodiment as illustrated in FIG. 12, when the unmanned aerial vehicle 1 moving diagonally upward above the slope 4 arrives near the top 5 of the slope 4, there will be no slope 4 in the horizontal direction from the unmanned aerial vehicle 1. Thus, the distance measuring unit 15 might not be able to measure the first horizontal distance $d_{11}$. In this case, it will be difficult for the movement amount decision unit 215 to accurately decide the horizontal movement amount and the vertical movement amount corresponding to the operation amount. When the first horizontal distance $d_{11}$ cannot be obtained, the maneuvering control unit 212 may fix the movement amount until the unmanned aerial vehicle 1 arrives at the end limit of the particular place. That is, when the first horizontal distance $d_{11}$ cannot be obtained, the maneuvering control unit 212 may not update the set movement amount information 223 until the unmanned aerial vehicle 1 arrives at the end limit of the slope 4, and may control the movement amount using the last set movement amount information 223 before the determination. The maneuvering control unit 212 may determine that the unmanned aerial vehicle 1 has arrived at the end limit of the slope 4 when the obtained first vertical distance die becomes larger than the last obtained first vertical distance $d_{12}$.

When it is determined that the unmanned aerial vehicle 1 has arrived at the end limit of the slope 4, the maneuvering control unit 212 may keep the unmanned aerial vehicle 1 still at that place. When it is determined that the unmanned aerial vehicle 1 has arrived at the end limit of the slope 4, the display unit 25 may provide a notification to the operator that the unmanned aerial vehicle 1 has arrived at the end limit of the slope 4. When it is determined that the unmanned aerial vehicle 1 has arrived at the end limit of the slope 4, the maneuvering control unit 212 may control the unmanned aerial vehicle 1 using the initial movement amount information 222.

Now, flight control processing for the unmanned aerial vehicle 1 moving along a first slope, a level surface continuing from the first slope, and a second slope continuing from the level surface will be described.

FIG. 13 is a schematic view for explaining the flight control processing for the unmanned aerial vehicle moving along the first slope, the level surface continuing from the first slope, and the second slope continuing from the level surface according to the embodiment of the present disclosure.

As illustrated in FIG. 13, the unmanned aerial vehicle 1 moves above a first slope 4A, a level surface 6 continuing from the first slope 4A, and a second slope 4B continuing from the level surface 6. When the unmanned aerial vehicle 1 moving diagonally upward above the first slope 4A arrives near the level surface 6, the distance measuring unit 15 of the unmanned aerial vehicle 1 measures the first horizontal distance $d_{11}$, which is the component in the horizontal direction, among the distances from the unmanned aerial vehicle 1 to the second slope 4B, instead of the first horizontal distance $d_{11}$, which is the component in the horizontal direction, among the distances from the unmanned aerial vehicle 1 to the first slope 4A. Since the first horizontal distance $d_{11}$ is far longer than the first vertical distance $d_{12}$, the unmanned aerial vehicle 1 comes close to the first slope 4A. In this regard, when the first horizontal distance $d_{11}$ becomes equal to or larger than the threshold value, the maneuvering control unit 212 may fix the movement amount until the unmanned aerial vehicle 1 arrives at the end limit of the particular place (first slope 4A). That is, when the first horizontal distance $d_{11}$ becomes equal to or larger than the threshold value, the maneuvering control unit 212 may not update the set movement amount information 223 until the unmanned aerial vehicle 1 arrives at the end limit of the slope 4, and may control the movement amount using the last set movement amount information 223 before the determination. The maneuvering control unit 212 may determine that the unmanned aerial vehicle 1 has arrived at the end limit of the first slope 4A when the obtained first vertical distance $d_{12}$ becomes larger than the first vertical distance $d_{12}$ obtained immediately before.

While the unmanned aerial vehicle 1 is moving above the first slope 4A, the operator operates both the first stick input unit 241 and second stick input unit 242. While the unmanned aerial vehicle 1 is moving above the level surface 6, the operator operates only the second stick input unit 242, which corresponds to the forward movement. While the unmanned aerial vehicle 1 is moving above the second slope 4B, the operator operates both the first stick input unit 241 and second stick input unit 242. As described above, operation by the operator is complicated when there is a level surface between two slopes.

In this regard, when the unmanned aerial vehicle 1 moves above the level surface 6 between the two slopes, the maneuvering control unit 212 may invalidate the vertical movement amount and control the flight of the unmanned aerial vehicle 1 using only the horizontal movement amount. More specifically, when it is determined that the unmanned aerial vehicle 1 has arrived at the end limit of the first slope 4A, the maneuvering control unit 212 reads the upward movement amount and the forward movement amount corresponding to the operation amounts of the first stick input unit 241 and the second stick input unit 242 from the set movement amount information 223 in the storage unit 22, invalidates the upward movement amount, and generates the control information including the forward movement amount which have been read.

This allows the operator to operate both the first stick input unit 241 and second stick input unit 242 also while the unmanned aerial vehicle 1 is moving above the level surface 6. As a result, operation will be easier for the operator even when there is a level surface between two slopes.

When the unmanned aerial vehicle 1 has moved across above the level surface 6 to arrive at the start limit of the second slope 4B, the maneuvering control unit 212 may revalidate the vertical movement amount and control the flight of the unmanned aerial vehicle 1 using the horizontal movement amount and the vertical movement amount. The maneuvering control unit 212 may determine that the unmanned aerial vehicle 1 has arrived at the start limit of the second slope 4B when the obtained first vertical distance $d_{12}$ becomes smaller than the first vertical distance $d_{12}$ obtained immediately before.

It should be noted that when the unmanned aerial vehicle 1 is to be moved diagonally downward along the slope, the operator moves the unmanned aerial vehicle 1 to a point where the first horizontal distance $d_{11}$, which is the component in the horizontal direction, and the first vertical distance $d_{12}$, which is the component in the vertical direction, among the distances from the unmanned aerial vehicle 1 to the slope are measurable, and then operates the adjustment command input unit 243. However, when the unmanned aerial vehicle 1 is near the top of the slope, the first horizontal distance $d_{11}$, which is the component in the horizontal direction, among the distances from the unmanned aerial vehicle 1 to the slope may not be measurable. In this regard, when the first horizontal distance $d_{11}$ is not obtained after the adjustment command input unit 243 has received the input of commanding adjustment of movement amount, the maneuvering control unit 212 may move the unmanned aerial vehicle 1 downward until the first horizontal distance $d_{11}$ is obtained. When the first horizontal distance $d_{11}$ is equal to or larger than the threshold value after the adjustment command input unit 243 has received the input of commanding adjustment of movement amount, the maneuvering control unit 212 may move the unmanned aerial vehicle 1 downward until the obtained first horizontal distance $d_{11}$ becomes smaller than the threshold value.

In this case, the maneuvering control unit 212 needs to decrease the height of the unmanned aerial vehicle 1 so that the unmanned aerial vehicle 1 does not crash into the slope. In this regard, the maneuvering control unit 212 may lower the unmanned aerial vehicle 1 until the first vertical distance $d_{12}$ becomes a predetermined distance. When the first horizontal distance $d_{11}$ is not obtained even when the first vertical distance $d_{12}$ becomes the predetermined distance, the maneuvering control unit 212 may move the unmanned aerial vehicle 1 forward by a predetermined distance. Thereafter, the maneuvering control unit 212 may lower the unmanned aerial vehicle 1 until the first horizontal distance $d_{11}$ is obtained. The maneuvering control unit 212 may repeat the forward movement and lowering of the unmanned aerial vehicle 1 until the first horizontal distance $d_{11}$ is obtained.

When the first horizontal distance $d_{11}$ is obtained, the maneuvering control unit 212 may start moving the unmanned aerial vehicle 1 diagonally downward from the point where the first horizontal distance $d_{11}$ has been obtained. When the first horizontal distance $d_{11}$ is obtained, the maneuvering control unit 212 may move the unmanned aerial vehicle 1 to a point where the unmanned aerial vehicle 1 has been before, and start moving the unmanned aerial vehicle 1 diagonally downward from that point. When the first horizontal distance $d_{11}$ is obtained, the display unit 25 may provide a notification to the operator that the unmanned aerial vehicle 1 can be moved.

When the unmanned aerial vehicle 1 is to be moved diagonally downward along the slope, the maneuvering control unit 212 may determine that the unmanned aerial vehicle 1 has arrived at the end limit of the slope when the obtained first vertical distance $d_{12}$ becomes smaller than the first vertical distance $d_{12}$ obtained immediately before.

Now, measuring point decision processing for the unmanned aerial vehicle 1 performed when measuring the distance to stairs will be described.

Figure 14:
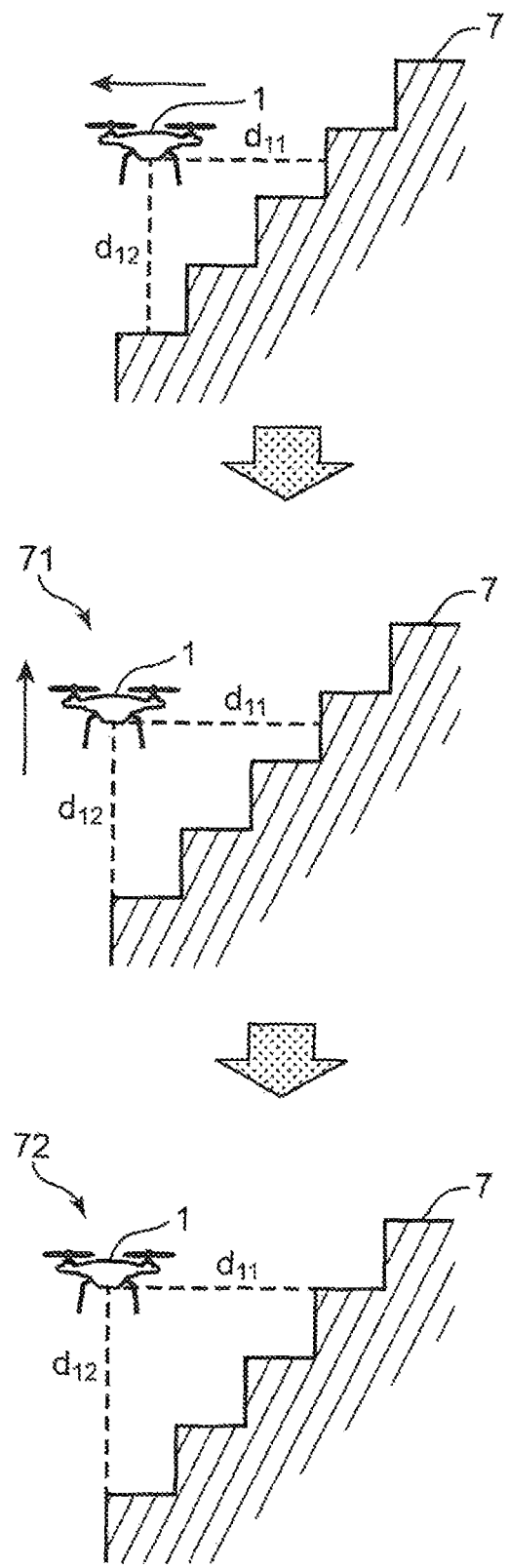
FIG. 14 is a schematic view for explaining measuring point decision processing for the unmanned aerial vehicle performed when measuring the distance to stairs according to the embodiment of the present disclosure.

FIG. 14 is a schematic view for explaining the measuring point decision processing for the unmanned aerial vehicle performed when measuring the distance to stairs according to the embodiment of the present disclosure.

In measuring the distance to stairs 7, the measured distance differs depending on where the unmanned aerial vehicle 1 is located. In this regard, the controller 2 automatically moves the unmanned aerial vehicle 1 to the point where the first horizontal distance $d_{11}$ and the first vertical distance $d_{12}$ are measured for adjusting the movement amount. Whether the slope above which the unmanned aerial vehicle 1 moves is the stairs 7 may be determined by checking an image captured by the camera 14 or by pushing a button indicating the start of movement above the stairs 7.

First, the maneuvering control unit 212 moves the unmanned aerial vehicle 1 in the horizontal direction, and during this movement, the first horizontal distance $d_{11}$ and the first vertical distance $d_{12}$ are obtained. The maneuvering control unit 212 makes this movement of the unmanned aerial vehicle 1 in the rearward direction, moving the unmanned aerial vehicle 1 further apart from the stairs 7.

Then, when there is a change in the first vertical distance $d_{12}$ while the unmanned aerial vehicle 1 is moving in the horizontal direction, the maneuvering control unit 212 moves the unmanned aerial vehicle 1 to a first point 71 where the unmanned aerial vehicle 1 has been located immediately before the change.

Then, the maneuvering control unit 212 moves the unmanned aerial vehicle 1 in the vertical direction from the first point 71, and during this movement, the first horizontal distance $d_{11}$ and the first vertical distance $d_{12}$ are obtained. The maneuvering control unit 212 makes this movement of the unmanned aerial vehicle 1 in the upward direction, moving the unmanned aerial vehicle 1 further apart from the stairs 7.

Then, when there is a change in the first horizontal distance $d_{11}$ while the unmanned aerial vehicle 1 is moving in the vertical direction, the maneuvering control unit 212 moves the unmanned aerial vehicle 1 to a second point 72 where the unmanned aerial vehicle 1 has been located immediately before the change.

Then, the communication unit 26 obtains the first horizontal distance $d_{11}$ and the first vertical distance $d_{12}$ at the second point 72.

In the example illustrated in FIG. 14, the first horizontal distance $d_{11}$ and the first vertical distance $d_{12}$ are obtained after the unmanned aerial vehicle 1 has been moved in the horizontal direction and the vertical direction. However, the present disclosure is not limited to this configuration. The first horizontal distance $d_{11}$ and the first vertical distance $d_{12}$ may be obtained after moving the unmanned aerial vehicle 1 only in the vertical direction.

In this case, the maneuvering control unit 212 first moves the unmanned aerial vehicle 1 in the vertical direction, and during this movement, the first horizontal distance $d_{11}$ and the first vertical distance $d_{12}$ are obtained. The maneuvering control unit 212 makes this movement of the unmanned aerial vehicle 1 in the upward direction, moving the unmanned aerial vehicle 1 further apart from the stairs 7.

Then, when there is a change in the first horizontal distance $d_{11}$ while the unmanned aerial vehicle 1 is moving in the vertical direction, the maneuvering control unit 212 moves the unmanned aerial vehicle 1 to the point where the unmanned aerial vehicle 1 has been located immediately before the change.

Then, the communication unit 26 obtains the first horizontal distance $d_{11}$ and the first vertical distance $d_{12}$ at the point where the unmanned aerial vehicle 1 has been located immediately before the change.

This results in the diagonal angle of the unmanned aerial vehicle 1 being larger than the sloping angle of the stairs 7, and thus prevents the unmanned aerial vehicle 1 from crashing into the stairs 7.

When the front side of the unmanned aerial vehicle 1 is not facing the front side of the stairs 7, it would be difficult to measure the distance accurately. In this regard, the controller 2 determines whether the front side of the unmanned aerial vehicle 1 is facing the front side of the stairs 7 and, when the front side of the unmanned aerial vehicle 1 is not facing the front side of the stairs 7, rotates the unmanned aerial vehicle 1.

Figure 15:
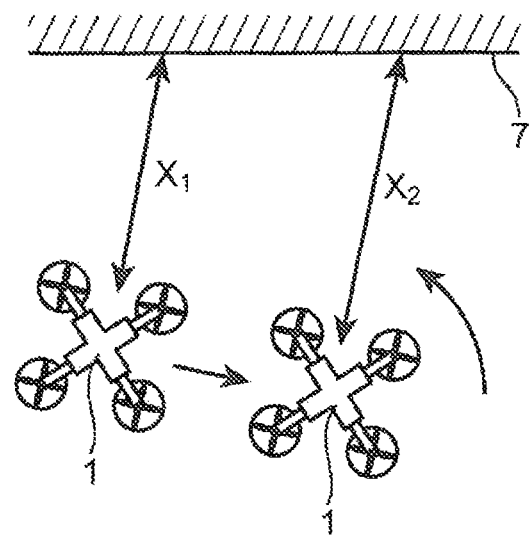
FIG. 15 is a schematic view for explaining positional correction for the unmanned aerial vehicle performed when measuring the distance to the stairs according to the embodiment of the present disclosure.

FIG. 15 is a schematic view for explaining positional correction for the unmanned aerial vehicle performed when measuring the distance to the stairs according to the embodiment of the present disclosure.

When the adjustment command input unit 243 has received the input of commanding adjustment of movement amount, the communication unit 26 transmits a distance measurement command signal to the unmanned aerial vehicle 1. When the distance measurement command signal is received by the communication unit 18, the distance measuring unit 15 of the unmanned aerial vehicle 1 measures, at a present first point, a distance $X_1$ in the horizontal direction from the unmanned aerial vehicle 1 to the stairs 7. Then, the communication unit 18 transmits the distance $X_1$ at the first point measured by the distance measuring unit 15 to the controller 2. Then, the communication unit 26 of the controller 2 receives the distance $X_1$ at the first point transmitted by the unmanned aerial vehicle 1, and outputs the distance $X_1$ to the maneuvering control unit 212.

Then, the maneuvering control unit 212 moves the unmanned aerial vehicle 1 leftward or rightward by a predetermined distance. In FIG. 15, the maneuvering control unit 212 moves the unmanned aerial vehicle 1 in the rightward direction by a predetermined distance. Then, the communication unit 26 transmits the distance measurement command signal to the unmanned aerial vehicle 1. When the distance measurement command signal is received by the communication unit 18, the distance measuring unit 15 of the unmanned aerial vehicle 1 measures, at a second point to which the unmanned aerial vehicle 1 has moved leftward or rightward from the first point, a distance $X_2$ in the horizontal direction from the unmanned aerial vehicle 1 to the stairs 7. Then, the communication unit 18 transmits the distance $X_2$ at the second point measured by the distance measuring unit 15 to the controller 2. Then, the communication unit 26 of the controller 2 receives the distance $X_2$ at the second point transmitted by the unmanned aerial vehicle 1, and outputs the distance $X_2$ to the maneuvering control unit 212.

Then, the maneuvering control unit 212 determines whether the distance $X_1$ at the first point and the distance $X_2$ at the second point are identical to each other. When it is determined that the distance $X_1$ at the first point and the distance $X_2$ at the second point are identical to each other, it means that the front side of the unmanned aerial vehicle 1 is facing the front side of the stairs 7, and the maneuvering control unit 212 starts the measuring point decision processing of the unmanned aerial vehicle.

When it is determined that the distance $X_1$ at the first point and the distance $X_2$ at the second point are not identical to each other, it means that the front side of the unmanned aerial vehicle 1 is not facing the front side of the stairs 7, and the maneuvering control unit 212 rotates the unmanned aerial vehicle 1 by a predetermined degree in the direction from the larger one to the smaller one among the distance $X_1$ and the distance $X_2$. In FIG. 15, the distance $X_1$ is smaller than the distance $X_2$, so that the maneuvering control unit 212 rotates the unmanned aerial vehicle 1 in the leftward direction by the predetermined degree. When the unmanned aerial vehicle 1 has been rotated, the communication unit 26 transmits the distance measurement command signal to the unmanned aerial vehicle 1. Thereafter, until the distance $X_1$ at the first point and the distance $X_2$ at the second point are determined to be identical to each other, measurement of the distance $X_2$ at the second point, measurement of the distance $X_1$ at the first point, and the rotation of the unmanned aerial vehicle 1 are repeated.

In the present embodiment, the processing of deciding the movement amount corresponding to the operation amount is performed when the adjustment command input unit 243 receives the input of commanding adjustment of movement amount. However, the present disclosure is not particularly limited to this configuration. Whether the unmanned aerial vehicle 1 is located above the slope may be determined while the unmanned aerial vehicle 1 controlled by the operator is moving. In this case, the communication unit 26 obtains the first horizontal distance $d_{11}$ and the first vertical distance $d_{12}$ which are periodically measured while the unmanned aerial vehicle 1 is moving. Based on the first horizontal distance $d_{11}$ and the first vertical distance $d_{12}$, the maneuvering control unit 212 determines whether the unmanned aerial vehicle 1 is located above a particular place where elevation gradually increase or decreases along the horizontal direction. The maneuvering control unit 212 may determine that the unmanned aerial vehicle 1 is located above a particular place (slope) when the obtained first horizontal distance $d_{11}$ and first vertical distance $d_{12}$ are respectively smaller than the previously obtained first horizontal distance $d_{11}$ and first vertical distance $d_{12}$. The movement amount decision unit 215 decides the movement amount when it is determined that the unmanned aerial vehicle 1 is located above the particular place.

In the present embodiment, the display unit 25 may present the positional relationship between the surface of the particular place and the unmanned aerial vehicle 1 based on the first horizontal distance $d_{11}$ and the first vertical distance $d_{12}$.

Figure 16:
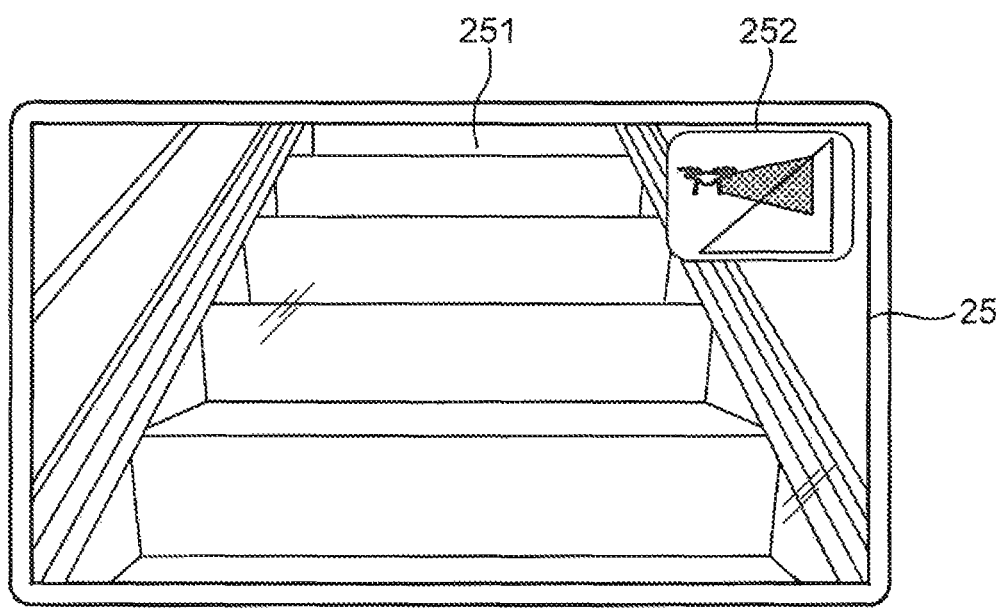
FIG. 16 is an example of a captured image presented on a display unit of the controller according to the embodiment of the present disclosure.

FIG. 16 is an example of a captured image presented on the display unit of the controller according to the embodiment of the present disclosure.

As illustrated in FIG. 16, the display unit 25 of the controller 2 presents a captured image 251 captured by the camera 14 of the unmanned aerial vehicle 1. The display unit 25 also presents an image 252 indicating the positional relationship between the slope, above which the unmanned aerial vehicle 1 is moving, and the unmanned aerial vehicle 1.

The control unit 21 may generate the image 252 indicating the positional relationship between the slope and the unmanned aerial vehicle 1 based on the first horizontal distance $d_{11}$ and the first vertical distance $d_{12}$. In this case, the control unit 21 can calculate the sloping angle of the slope from the first horizontal distance $d_{11}$ and the first vertical distance $d_{12}$. The control unit 21 generates the image 252 including a triangular image having a shape corresponding to the sloping angle of the slope, and an image of unmanned aerial vehicle created at a point in accordance with the distance from the slope to the unmanned aerial vehicle 1.

The display unit 25 may present the image 252 overlapping on the captured image 251 or present the image 252 at a place different from the place of the captured image 251.

The display unit 25 may present a piece of text indicating the positional relationship between the slope, above which the unmanned aerial vehicle 1 is moving, and the unmanned aerial vehicle 1. The controller 2 may further include an audio output unit that outputs audio information indicating the positional relationship between the slope, above which the unmanned aerial vehicle 1 is moving, and the unmanned aerial vehicle 1.

As described above, the positional relationship between the surface of the particular place and the unmanned aerial vehicle 1 is presented based on the first horizontal distance $d_{11}$ and the first vertical distance $d_{12}$, so that the operator can recognize in what manner the unmanned aerial vehicle 1 is moving.

The maneuvering control unit 212 may set the moving direction of the unmanned aerial vehicle 1 based on the movement amount to the direction in which the camera 14 captures an image. In this configuration, an image in the moving direction of the unmanned aerial vehicle 1 is captured, so that the operator can see the moving direction of the unmanned aerial vehicle 1 while controlling the unmanned aerial vehicle 1.

In the present embodiment, the control unit 21 may present, on the display unit 25, a screen for checking whether the set movement amount information 223 is to be registered at a timing when the set movement amount information 223 is first set or at a timing when the unmanned aerial vehicle 1 arrives at the top of the slope. When the set movement amount information 223 is to be registered, the control unit 21 may receive the input of identification information given by the operator, and store the identification information, which has been input by the operator, and the set movement amount information 223 in the storage unit 22 with the identification information associated with the set movement amount information 223. Furthermore, when the adjustment command input unit 243 has received the input of commanding adjustment of movement amount, the display unit 25 may present the identification information in a selective manner to the operator. The maneuvering control unit 212 reads the set movement amount information 223 corresponding to the selected identification information from the storage unit 22, and moves the unmanned aerial vehicle 1 using the set movement amount information 223 which has been read. As described above, previously storing the set movement amount information 223 of a frequently used place reduces the time required for setting the set movement amount information 223.

The unmanned aerial vehicle 1 may further include a position obtaining unit that obtains positional information indicating the present position of the unmanned aerial vehicle 1. The position obtaining unit is, for example, a global positioning system (GPS) receiver. The control unit 21 of the controller 2 may obtain positional information from the unmanned aerial vehicle 1 at a timing when the set movement amount information 223 is first set or at a timing when the unmanned aerial vehicle 1 arrives at the top of the slope, and store the positional information and the set movement amount information 223 in the storage unit 22 with the positional information associated with the set movement amount information 223. When the adjustment command input unit 243 receives the input of commanding adjustment of movement amount, the maneuvering control unit 212 may obtain the positional information from the unmanned aerial vehicle 1, and determine whether the set movement amount information 223 corresponding to the obtained positional information exists in the storage unit 22. When the set movement amount information 223 corresponding to the obtained positional information exists in the storage unit 22, the maneuvering control unit 212 may read the set movement amount information 223 corresponding to the obtained positional information from the storage unit 22, and move the unmanned aerial vehicle 1 using the set movement amount information 223 which has been read. As described above, previously storing the positional information and the set movement amount information 223 of a frequently used place in association with each other reduces the time required for setting the set movement amount information 223.

In the present embodiment, when the adjustment command input unit 243 receives the input of commanding adjustment of movement amount, the controller 2 decides the movement amount, and moves the unmanned aerial vehicle 1 in the diagonal direction using the set movement amount information 223 which has been set. However, the present disclosure is not particularly limited to this configuration. When the adjustment command input unit 243 has received the input of commanding adjustment of movement amount, the maneuvering control unit 212 may move the unmanned aerial vehicle 1 in a diagonal direction using the initial movement amount information 222. Also, while the unmanned aerial vehicle 1 is moving, the controller 2 may decide the movement amount, and move the unmanned aerial vehicle 1 in a diagonal direction using the set movement amount information 223 which has been set.

The control unit 11 of the unmanned aerial vehicle 1 may include the ratio calculating unit 214, the movement amount decision unit 215, the movement amount setting unit 216, and the distance calculating unit 217. The storage unit 12 of the unmanned aerial vehicle 1 may store the initial movement amount information 222 and the set movement amount information 223.

Each component of the embodiments described above may be a dedicated piece of hardware or realized by executing a software program suitable for each component. Each component may be realized by a program executing a device, such as a CPU and a processor, reading and executing a software program stored in a medium, such as a hard disk and a semiconductor memory.

A part or all of the functions of the device according to the embodiment of the present disclosure is typically realized in a form of a large scale integration (LSI), which is an integrated circuit. These may each be provided as a single chip or a portion or all of them may be included in a single chip. The integrated circuit is not limited to an LSI but may be realized in a form of a dedicated circuit or a general-purpose processor. A field programmable gate array (FPGA), which is an LSI programmable after having been manufactured, or a reconfigurable processor in which connection and setting of a circuit cell in the LSI are reconfigurable may be used.

A portion or all of the functions of the device according to the embodiment of the present disclosure may be realized by executing a program by a processor, such as a CPU.

Values used above are all exemplarily presented to specifically explain the present disclosure, so that the present disclosure is not limited by the exemplary values.

The order of executing the steps shown in the flowchart is an example for specifically explaining the present disclosure. As long as the same effect is obtainable, the steps may be executed in an order other than the order described above. A portion of the step described above may be executed at the same time as the execution of (in parallel with) a different step.

A technique according to the present disclosure provides assistance in operating an unmanned aerial vehicle moving in a diagonal direction and easiness to operate the unmanned aerial vehicle, and is thus useful for a technique of controlling the movement of the unmanned aerial vehicle.

The invention claimed is:

1. An information processing device comprising:
a processor; and
a memory that stores a program,
wherein, when the program is executed by the processor, the program causes the processor to execute:
obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;
deciding, based on a ratio of the first horizontal distance to the first vertical distance, a movement amount by which the unmanned aerial vehicle is to be moved simultaneously in the horizontal direction and the vertical direction; and
moving the unmanned aerial vehicle based on the movement amount,
wherein, the program further causes the processor to execute acquiring a posture of the moving unmanned aerial vehicle,
wherein, the obtaining further obtains a second horizontal distance and a second vertical distance measured when the unmanned aerial vehicle is taking the posture, the second horizontal distance and the second vertical distance respectively being a component in a horizontal direction and a component in a vertical direction among distances from the unmanned aerial vehicle to the surface of the particular place, and
wherein, the obtaining obtains the first horizontal distance and the first vertical distance by calculating the first horizontal distance and the first vertical distance based on the posture of the unmanned aerial vehicle, the second horizontal distance, and the second vertical distance.

2. The information processing device according to claim 1, wherein the deciding decides the movement amount based on an operation amount which is input to a controller that receives a control of the unmanned aerial vehicle by an operator, and the ratio.

3. The information processing device according to claim 1, wherein
the obtaining obtains the first horizontal distance and the first vertical distance periodically measured while the unmanned aerial vehicle is moving,
the program further causes the processor to execute determining whether the unmanned aerial vehicle is located above the particular place based on the first horizontal distance and the first vertical distance, and
the deciding decides the movement amount when it is determined that the unmanned aerial vehicle is located above the particular place.

4. The information processing device according to claim 1, wherein the program further causes the processor to execute presenting positional relationship between the surface of the particular place and the unmanned aerial vehicle based on the first horizontal distance and the first vertical distance.

5. The information processing device according to claim 1, wherein
the unmanned aerial vehicle includes an image capturing device, and
the program further causes the processor to execute setting a moving direction of the unmanned aerial vehicle based on the movement amount to a direction in which the image capturing device captures an image.

6. A flight control system comprising:
an unmanned aerial vehicle including a sensor that measures a first horizontal distance and a first vertical distance which are respectively a component in a horizontal direction and a component in a vertical direction among distances from the unmanned aerial vehicle to a surface of a particular place where elevation gradually increases or decreases along a horizontal direction; and
the information processing device according to claim 1.

7. An information processing device comprising:
a processor; and
a memory that stores a program,
wherein, when the program is executed by the processor, the program causes the processor to execute:
obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;
deciding, based on a ratio of the first horizontal distance to the first vertical distance, a movement amount by which the unmanned aerial vehicle is to be moved simultaneously in the horizontal direction and the vertical direction; and
moving the unmanned aerial vehicle based on the movement amount,
wherein the deciding further redecides the movement amount when one of the first horizontal distance and the first vertical distance becomes equal to or less than a threshold value.

8. An information processing device comprising:
a processor; and
a memory that stores a program,
wherein, when the program is executed by the processor, the program causes the processor to execute:
obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;
deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein the moving fixes the movement amount until the unmanned aerial vehicle arrives at an end limit of the particular place when the first horizontal distance becomes equal to or larger than a threshold value or when the first horizontal distance is not obtained.

9. An information processing device comprising:

a processor; and a memory that stores a program, wherein, when the program is executed by the processor, the program causes the processor to execute:

obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;

deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein, the obtaining obtains the first horizontal distance and the first vertical distance which are periodically measured while the unmanned aerial vehicle is moving, wherein, the moving:
  moves the unmanned aerial vehicle in the horizontal direction, the first horizontal distance and the first vertical distance being obtained while the unmanned aerial vehicle is moving;
  moves the unmanned aerial vehicle to a first point when the first vertical distance changes while the unmanned aerial vehicle is moving in the horizontal direction, the first point being a point where the unmanned aerial vehicle has been located immediately before the change;
  moves the unmanned aerial vehicle in the vertical direction from the first point, the first horizontal distance and the first vertical distance being obtained while the unmanned aerial vehicle is moving; and
  moves the unmanned aerial vehicle to a second point when the first horizontal distance changes while the unmanned aerial vehicle is moving in the vertical direction, the second point being a point where the unmanned aerial vehicle has been located immediately before the change, and wherein, the obtaining obtains the first horizontal distance and the first vertical distance at the second point.

10. An information processing method, the method causes a processor to execute:

obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;

deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein, the method further causes the processor to execute acquiring a posture of the moving unmanned aerial vehicle, wherein, the obtaining further obtains a second horizontal distance and a second vertical distance measured when the unmanned aerial vehicle is taking the posture, the second horizontal distance and the second vertical distance respectively being a component in a horizontal direction and a component in a vertical direction among distances from the unmanned aerial vehicle to the surface of the particular place, and wherein, the obtaining obtains the first horizontal distance and the first vertical distance by calculating the first horizontal distance and the first vertical distance based on the posture of the unmanned aerial vehicle, the second horizontal distance, and the second vertical distance.

11. An information processing method, the method causes a processor to execute:

obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;

deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein the deciding further redecides the movement amount when one of the first horizontal distance and the first vertical distance becomes equal to or less than a threshold value.

12. An information processing method, the method causes a processor to execute:

obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;

deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein the moving fixes the movement amount until the unmanned aerial vehicle arrives at an end limit of the particular place when the first horizontal distance becomes equal to or larger than a threshold value or when the first horizontal distance is not obtained.

13. An information processing method, the method causes a processor to execute:

obtaining a first horizontal distance and a first vertical distance which are respectively a component in a horizontal direction and a component in a vertical direction among distances from an unmanned aerial vehicle to a surface of a particular place where elevation gradually increases or decreases along a horizontal direction;

deciding, based on a ratio of the first horizontal distance to the first vertical distance, a movement amount by which the unmanned aerial vehicle is to be moved simultaneously in the horizontal direction and the vertical direction; and moving the unmanned aerial vehicle based on the movement amount, wherein, the obtaining obtains the first horizontal distance and the first vertical distance which are periodically measured while the unmanned aerial vehicle is moving, wherein, the moving:

moves the unmanned aerial vehicle in the horizontal direction, the first horizontal distance and the first vertical distance being obtained while the unmanned aerial vehicle is moving;

moves the unmanned aerial vehicle to a first point when the first vertical distance changes while the unmanned aerial vehicle is moving in the horizontal direction, the first point being a point where the unmanned aerial vehicle has been located immediately before the change;

moves the unmanned aerial vehicle in the vertical direction from the first point, the first horizontal distance and the first vertical distance being obtained while the unmanned aerial vehicle is moving; and moves the unmanned aerial vehicle to a second point when the first horizontal distance changes while the unmanned aerial vehicle is moving in the vertical direction, the second point being a point where the unmanned aerial vehicle has been located immediately before the change, and wherein, the obtaining obtains the first horizontal distance and the first vertical distance at the second point.

\* \* \* \* \*